United States Patent [19]

Schlegel et al.

[11] Patent Number: 4,629,060
[45] Date of Patent: Dec. 16, 1986

[54] APPARATUS FOR HANDLING BULK MATERIAL

[76] Inventors: Hans J. Schlegel, 3601 84th Cir., N., Minneapolis, Minn. 55443; Helmut Wolf, Sielkamp 52, 3300 Braunschweig, Fed. Rep. of Germany

[21] Appl. No.: 640,660

[22] Filed: Aug. 14, 1984

[51] Int. Cl.⁴ ............................................. B65G 65/06
[52] U.S. Cl. ...................................... 198/508; 414/133
[58] Field of Search ..................... 198/508, 511, 519; 414/133

[56] References Cited

U.S. PATENT DOCUMENTS 4,244,463 1/1981 Bartley ................................. 198/508
4,363,396 12/1982 Wolf et al. ........................... 198/508

Primary Examiner—Joseph E. Valenza
Assistant Examiner—D. Glenn Dayoan
Attorney, Agent, or Firm—Salter & Michaelson

[57] ABSTRACT

Apparatus for handling bulk material located in a pile at a storage site including a stationary support column that is anchored at the lowermost end thereof. The support column supports a stacker device at the uppermost end thereof, the stacker device being mounted for rotating movement relative to said support column for stacking the material at the storage site in a substantially circular array. A material feed device is mounted over said stacker device and feeds the material thereto during the stacking operation. Mounted for rotary movement relative to said support column is a reclaimer device, the reclaimer device being operable to reclaim the material from the pile for transfer thereof to a discharge area. The reclaimer device is rotated about a vertical axis to provide access to the circular array of material, the vertical axis of rotation of the reclaimer being disposed such that it is not coincident with the longitudinal axis of said support column, wherein the reclaimer device is rotatable about its own axis through a range of 0° to about 310° without interference with the support column.

43 Claims, 16 Drawing Figures

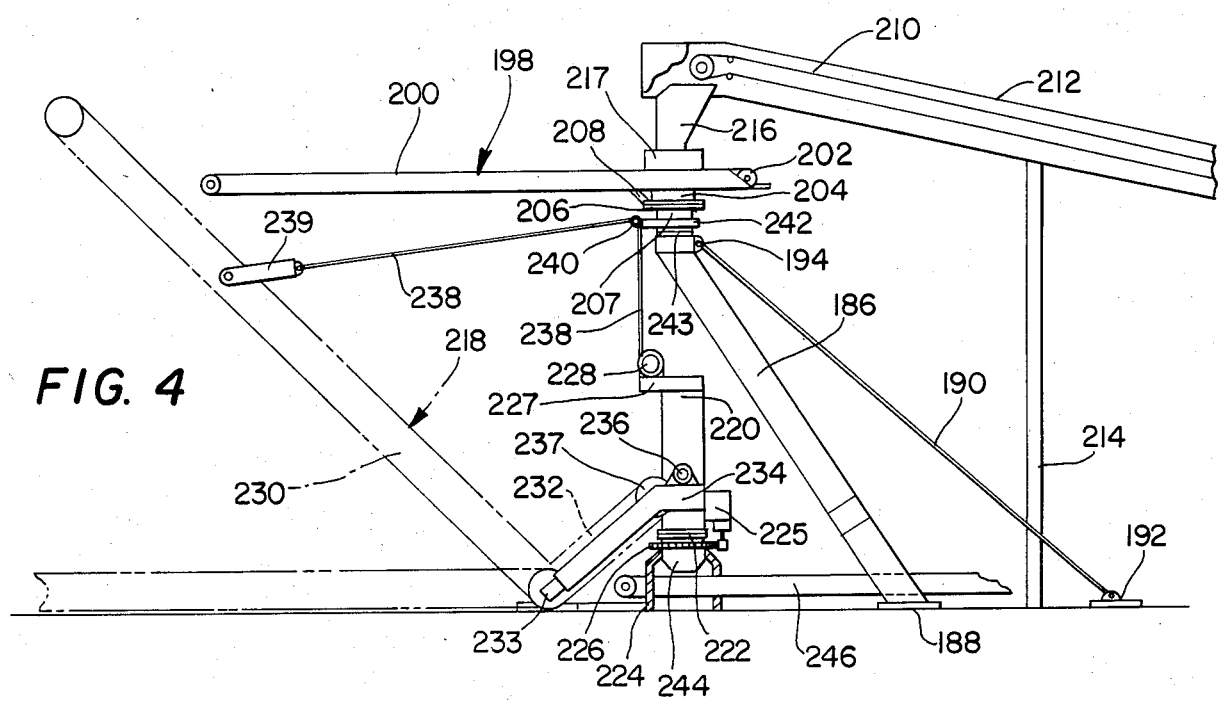
FIG. 4
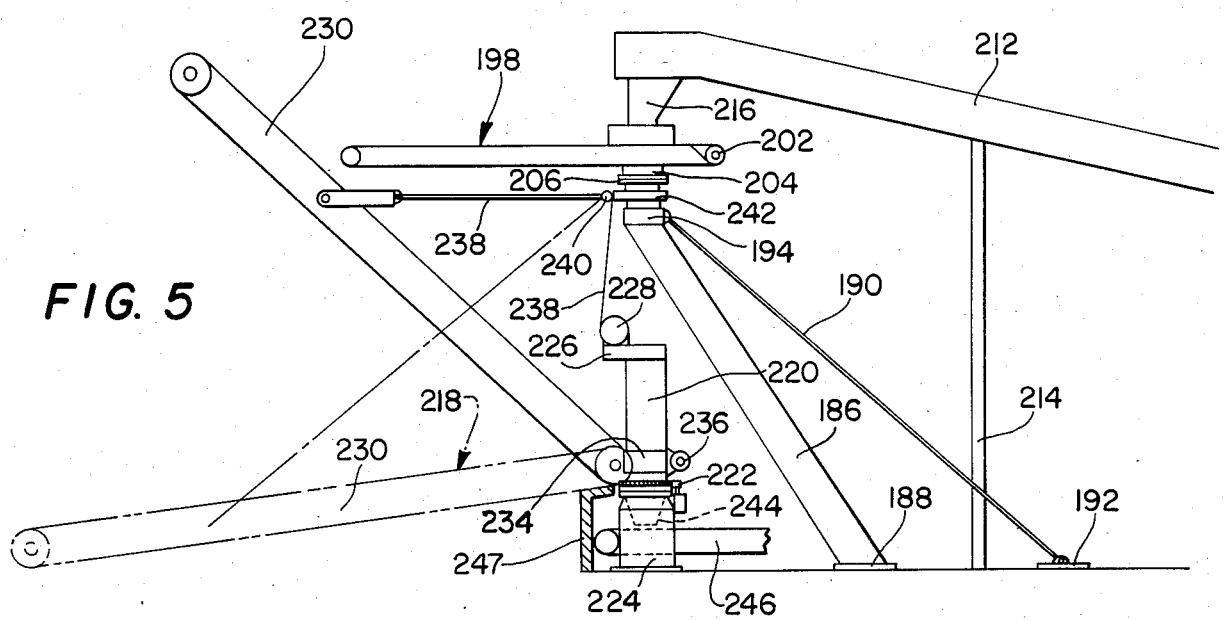
FIG. 5
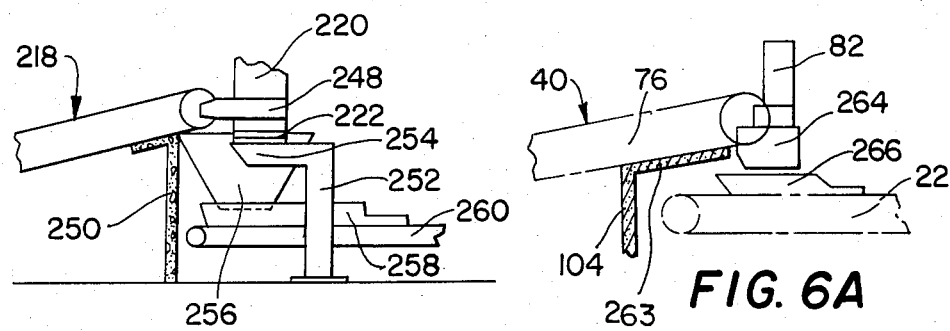
FIG. 6
FIG. 6A

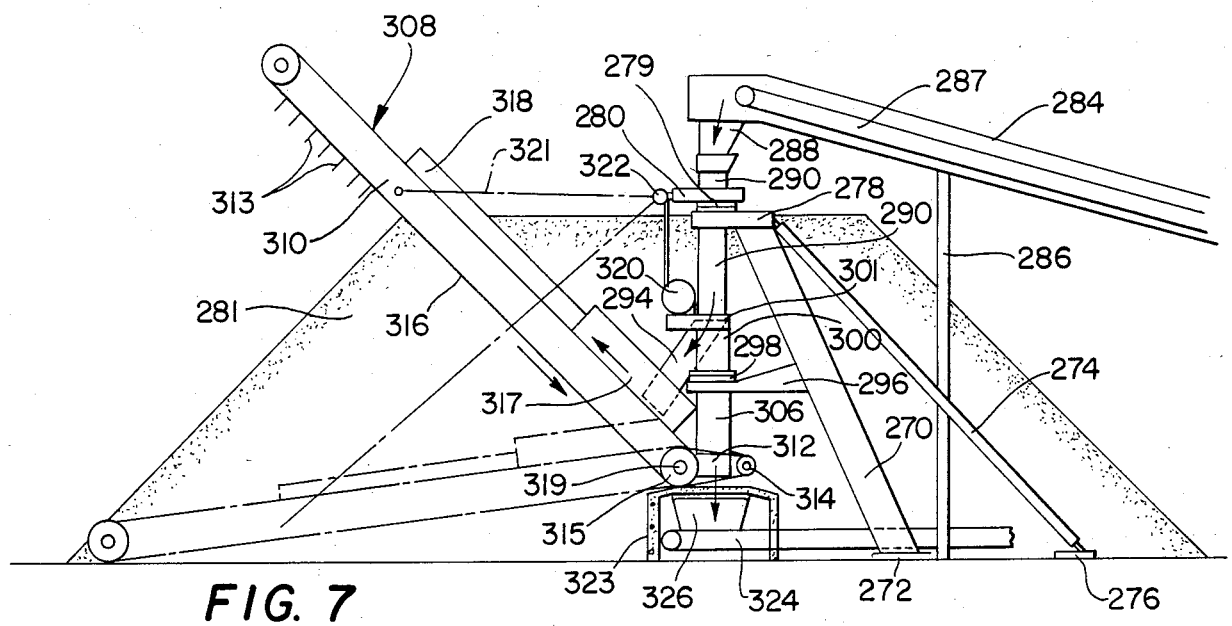
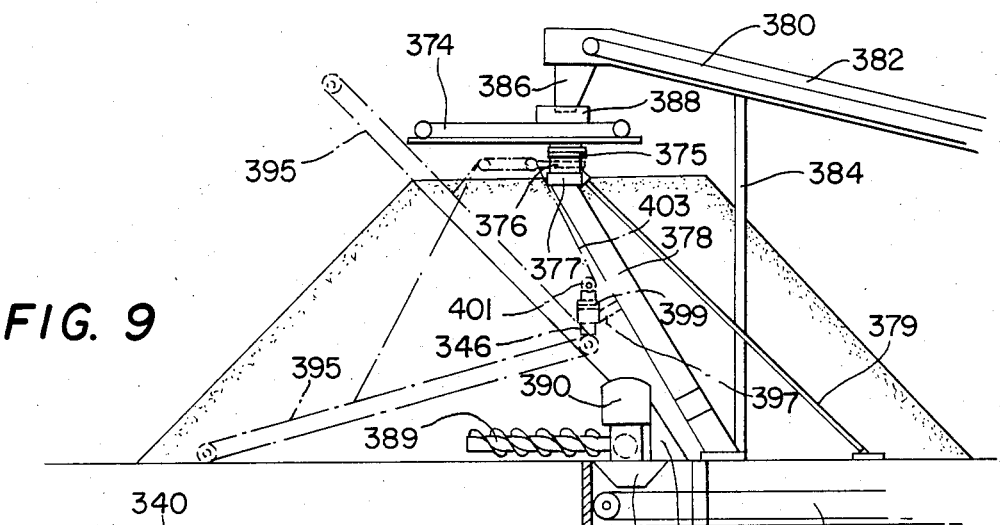
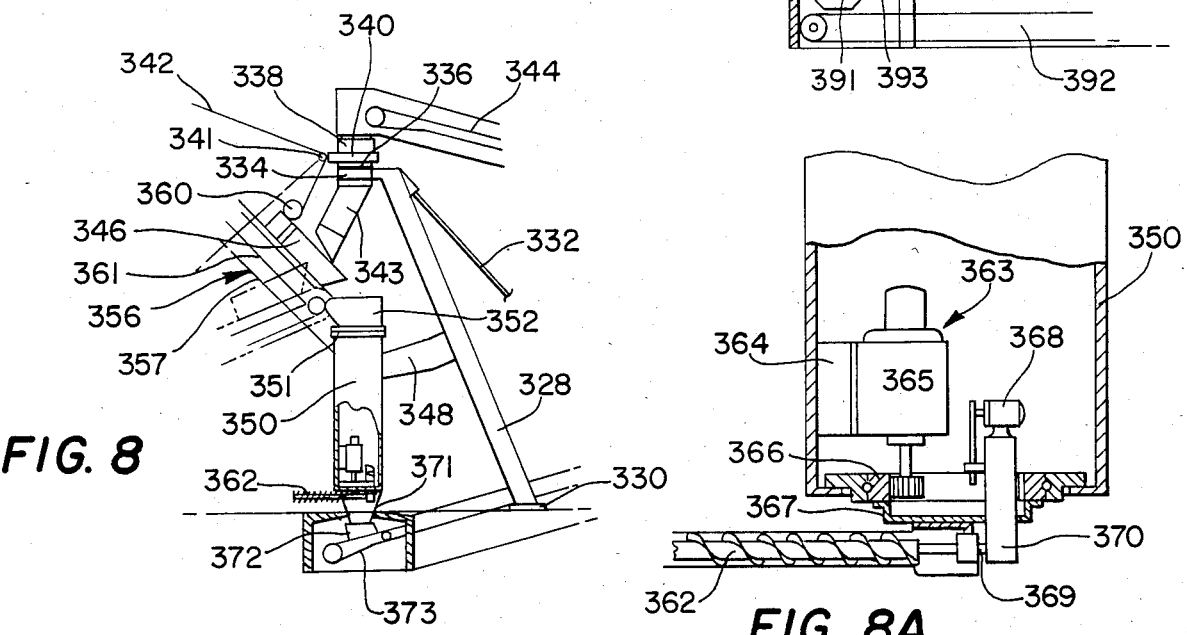
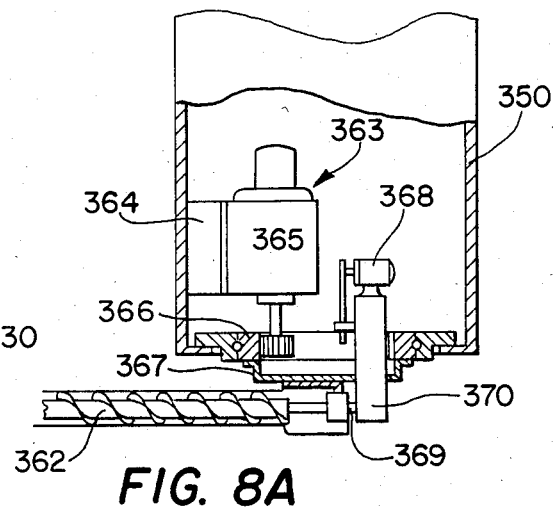

4,629,060

APPARATUS FOR HANDLING BULK MATERIAL

BACKGROUND OF THE INVENTION

The present invention has particular application for building up and discharging an annular dump of bulk material at a circular storage site.

The prior known apparatus for handling bulk material as located at a storage site have included several versions of the well known stacker-reclaimer apparatus, and two of such kinds of equipment are illustrated in the U.S. Patents to STROCKER, U.S. Pat. No. 3,472,357 and FISHER, U.S. Pat. No. 3,509,985. Both the STROCKER and FISHER patents disclose equipment that includes a device for receiving bulk material from a feed conveyor and for conveying and dumping the bulk material onto a pile at the storage device. The usual scraper reclaimer devices are also disclosed in these prior known constructions for removing the bulk material from the stored piles for transfer to a remote location. In other versions of stacker-reclaimers, the equipment included a support structure that was mounted on wheels for travel along elongated tracks on both sides of which the bulk material was deposited in stored piles. The stacking mechanism and the scraper reclaimer devices were both pivotally mounted on the traveling structure and were rotated therewith. In the apparatus as shown in the STROCKER patent, both the stacker and the scraper reclaimer devices are also pivotally mounted with respect to the main frame of the apparatus, and in this manner are able to stack the bulk material and reclaim it from the stacked pile as required. However, this equipment as constructed was not practical for simultaneous stacking and reclaiming of the bulk material. In the FISHER patent, the piles of material are arranged in piles relative to a stationary central column, and the stacker and reclaimer are rotated relative to the stationary column for both stacking the bulk material and reclaiming it as required. The FISHER apparatus also includes a fixed hopper that is mounted under the column for receiving the bulk material from the scraper reclaimer device for transfer to a remote location. However, the hopper has spokes fixed thereto that support the column; and as a result, the hopper is obstructed and the material tends to clog the hopper as it is deposited therein. Further, the reclaimer and stacker devices in this construction cannot pass each other, but must still work on material arrayed in a 360° pile, requiring complex and expensive equipment, including an undergound discharge conveyor. The FISHER construction also requires that the feed end of the feed conveyor be supported by the central column which further requires a complex bearing arrangement that additionally increases the cost of the unit.

Both the bulk material handling apparatus as illustrated in the STROCKER and FISHER patents were useful in certain environments, but were limited in the application thereof because of the bulky equipment used and space requirements therefor. Further the heavy loads as carried by the scraper conveyor apparatus illustrated in the STROCKER patent, required that the stacker and scraper reclaimer devices utilized therein be cantilevered in a manner so as to effectively offset each other. Locating these devices on a central column as shown in the STROCKER patent had its inherent disadvantages; and because of cost factors, the STROCKER scraper-conveyor apparatus could only be used in special applications. Similarly, the FISHER conveyor loading and unloading apparatus are quite complex in the structural arrangement thereof and, as a result, the economic factors dictated that the FISHER apparatus could only be used in those locations that would warrant the installation of that kind of equipment. Another system known to applicants but having limited commercial use included a tower construction having a truss structure on which a stacker device was supported for conveying bulk material to a pile. Offset from the tower was a reclaimer device that was supported by the tower; but because the reclaimer device had limited rotational movement relative to the tower, this system had only limited application.

Some efforts were made by the applicants herein to provide a relatively simplified device for building up and discharging an annular dump of bulk material at a circular storage site, and this device is illustrated in U.S. Pat. No. 4,363,396. As shown in U.S. Pat. No. 4,363,396, a scraper reclaimer device and a stacker device are mounted on a rotating column for movement with and relative thereto, respectively; and the material as recovered by the scraper reclaimer device is deposited into a hopper that is unobstructed at the receiving end thereof, this kind of hopper being contrary to the kind of hopper shown in the earlier described FISHER patent. However, because of certain limitations with respect to the costs embodied in the device shown in U.S. Pat. No. 4,363,396, the device also had some limitations in use; although, as an operating mechanism, it has found favor in the trade. It was because of economic considerations and the facility of use thereof that the subject invention was developed, and in this respect does present an alternative to the device shown in U.S. Pat. No. 4,363,396.

SUMMARY OF THE INVENTION

The present invention embodies a unique approach for a device that is utilized in the building up and discharging of an annular dump of bulk material at a circular storage site.

Contrary to the conventional equipment utilized heretofore in forming and/or discharging a circular pile of bulk material, the present invention provides a stationary column on which a stacker device is mounted, a reclaimer device being located such that the axis thereof is not coincident with the axis of the column. Both the stacker and the reclaimer devices are independently rotatable about their axis, although these devices can be arranged in either concentric or eccentric relation relative to each other. In one form of the present invention, the supporting column for the stacker having an appropriate foundation is disposed in an inclined position and is supported in the inclined position with stabilizers that are fixed to the ground at one end thereof and at the other end are fixed to the uppermost end of the column, wherein the stabilizers are maintained mainly under tension and cooperate to support the column when it is mainly under compression loads the stacker and reclaimer devices. In another form of the invention, the support column for the stacker is located in a vertical position.

Since the prior known stacker and/or reclaimer systems rotated around a central axis that also defined the axis of the stacker support, the location of the support imposed limits on the reclaimer design relative to the weight of the reclaimer structure and the size of the bearing elements and the manner in which the material was discharged. By providing the offset axis for the stacker support relative to the axis of the reclaimer device in the present invention, the reclaimer devices are capable of reaching a rotation of substantially more than 180°; and in most versions of applicants' unique system, the reclaimer device is capable of being rotated about its axis up to approximately 310° from the position of rest. The subject invention further provides that the stacker device is rotated wholly independently of the reclaimer device, and each can pass the other in their rotating movement at any given period of operation of the unit.

Because the axis of the stacker support is not coincident with the axis of the reclaimer device, the design of the reclaimer device is not determined by considerations for supporting the stacker; and, as a result, the reclaimer device may be designed without providing for either supporting or accommodating the stacker structure in some manner.

Accordingly, it is an object of the present invention to provide apparatus for building up and discharging an annular pile of bulk material at a circular storage site through the use of a stacker support column, the axis of which is not coincident with the axis of a reclaiming device that is incorporated in said apparatus for removing the material from the pile.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 3(a) is a partial plan view of FIG. 3;

FIG. 4 is a side elevational view of a further modified form of the invention;

FIG. 5 is a side elevational view of a still further modified form of the invention;

FIG. 6 is a side elevational view with parts shown in section of a detail of a modified hopper construction as embodied in the subject invention;

FIG. 6(a) is a view similar to FIG. 6 showing a still further modified form of hopper construction;

FIG. 7 is a side elevational view of another modified form of the system as embodied in the present invention;

FIG. 8 is a partial side elevational view of a variation of the structure as illustrated in FIG. 7 and includes a screw conveyor as the reclaimer device;

FIG. 8(a) is an enlarged sectional view of the reclaimer screw conveyor and drive therefor as shown in FIG. 8;

FIG. 9 is a side elevational view of a form of the invention that includes a stacker device and a screw type of reclaimer device;

DESCRIPTION OF THE EMBODIMENTS OF THE INVENTION

Figure 1:
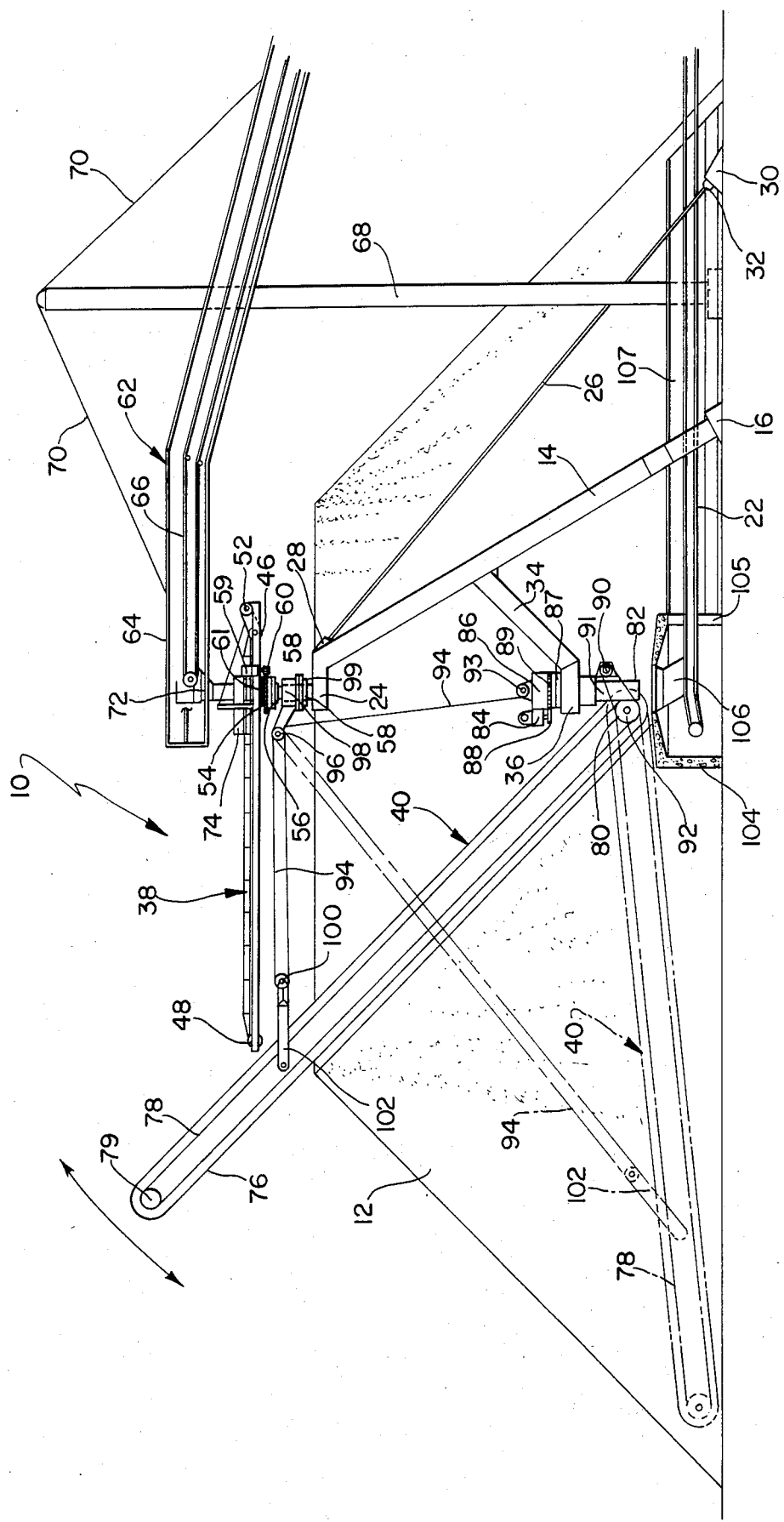
FIG. 1 is a side elevational view with some elements shown diagrammatically of one form of the device as embodied in the subject invention, illustrating a support column as mounted in inclined relation and supporting a stacker and reclaimer devices thereon.
Figure 2:
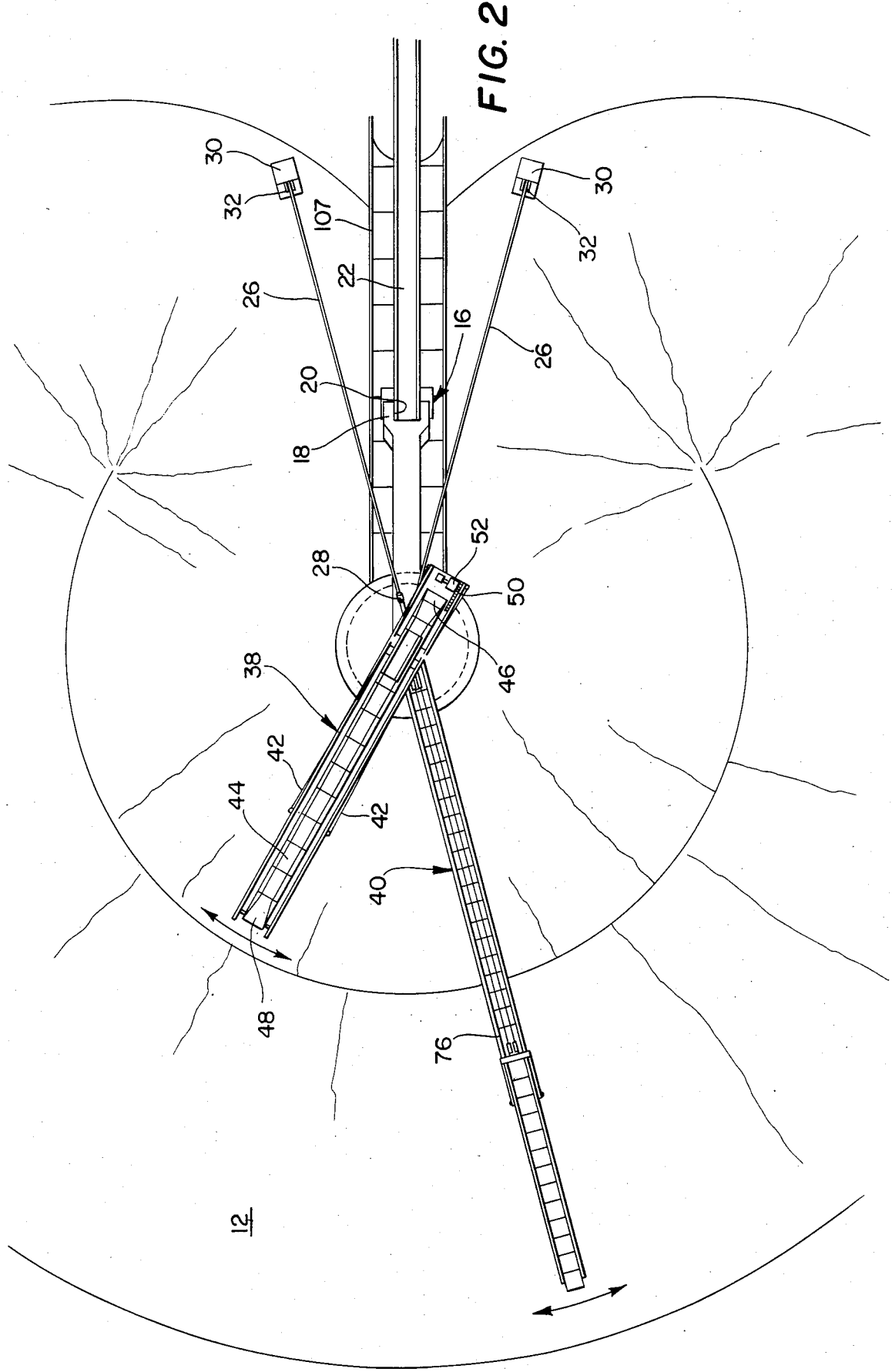
FIG. 2 is a top plan view of the invention as illustrated in FIG. 1.

Referring now to FIGS. 1 and 2, one form of the apparatus as embodied in the subject invention is illustrated and is generally indicated at 10. The apparatus 10 is of the type for operation at a circular storage site in which an annular dump or pile of material indicated at 12 is stored for removal to a remote location. As illustrated in the drawing, the annular pile 12 is composed of a bulk material of any known variety and has an angle of repose that is defined by the angle between the sides thereof and the horizontal. As will be described, a reclaimer device that is formed as part of the apparatus of the subject invention is disposed in generally parallel relation with the inclination of the pile of material and is pivotally movable to follow the angle of the surface of the pile and is also rotatable about its vertical axis as required during the reclaiming operation.

As described hereinafter, the components that define the stacker and reclaimer units of the subject invention are illustrated somewhat diagrammatically, but are believed to be sufficiently illustrated and disclosed to enable anyone skilled in the art to which the invention pertains to have a full and complete understanding thereof. In this connection, the manner in which the units are mounted for rotation on the support members is sufficiently described to obtain a clear understanding of the operation of the invention. In this connection, reference is also made to motor drive devices through pinion ring-gear units. This structure of the motor drive devices as illustrated and described is considered to be conventional and forms no part of the present invention.

Heretofore, the most commonly used stacker and reclaimer devices utilized at circular storage sites have normally been mounted for rotation about a central column that in effect defined a support therefor. The subject invention departs from this prior known construction and includes an offset support column 14. In the form of the invention shown in FIG. 1, the support colum 14 which is preferably formed of a structural metal material of any suitable design, is disposed in inclined relationship with respect to the vertical and is mounted in fixed position on a foundation 16 that is anchored into the ground at the storage site. As will be described, and as illustrated in FIG. 2, the lowermost end of the colum 14 is somewhat enlarged as indicated at 18, the enlarged portion 18 having an opening 20 formed therein to permit a discharge conveyor 22 to pass therethrough. The enlarged portion 18 of the column 14 also tends to stabilize the column when it is subjected to side loads. Fixed to the uppermost end of the inclined column 14 is an upper jib 24, the central axis of which is substantially vertical, the central axis being disposed in angular relation with respect to the longitudinal axis of the column 14. Thus, the axis of the colum 14 is located such that it is not coincident with respect to the central axis of the jib 24. In order to anchor the support column 14 in place so as to provide for effectively carrying the loads that are imposed thereon during the operation of the apparatus are a pair of stabilizers 26 which as shown in FIG. 2 extend angularly downwardly and outwardly relative to the inclined support column 14 and are fixed to the uppermost end of the column by conventional tie bolts 28 or some similar connecting means. The lowermost ends of the stabilizers 26 are anchored in concrete bases 30 by bolts that extend through brackets 32 that are fixed to the bases 30. As will be described, in the operation of the device, the inclined support column 14 carries the loads imposed thereon by the stacker and reclaimer devices, the loads transmitted therefrom being directed mainly in compression toward the bottom of the column 14 and toward the concrete bases 16. The stabilizers 26 which may be in the form of wires or structural members are disposed mainly in tension and cooperate with the support column 14 to absorb the loads as the stacker and reclaimer devices are rotated during operation of the apparatus.

Secured to the support column 14 approximately at the midpoint thereof is a downwardly inclined lower jib 34 which includes an horizontal extension 36, the central axis of which is substantially vertical and that is generally coaxial with the central axis of the upper jib 24. As will now be described, a stacker device generally indicated at 38 is mounted for rotation on the upper jib 24 relative thereto while a reclaimer device generally indicated at 40 is mounted on the extension 36 of the lower jib 34 and is rotated relative thereto and also relative to the rotation of the stacker device 38. As will be apparent, the loads as imposed by both the stacker device 38 and the reclaimer device 40 are carried by the support column 14 and the stabilizers 26 fixed thereto, and the arrangement of the column 14 with its stabilizers 26 is such as to effectively absorb the loads during the operation of the apparatus.

As shown in FIGS. 1 and 2, the stacker device 38 includes spaced side frame members 42 between which a trough conveyor 44 is located. The trough conveyor which is of the endless type is movable on end rollers 46 and 48, the end roller 46 defining the drive for the conveyor 44 and being interconnected by a chain 50 to a motor drive unit 52 that is mounted on the frame of the stacker 38. The motor drive unit 52 is selectively driven to move the conveyor 44 in the operation of the stacker device, as will be described. The stacker device 38 is mounted on the upper jib 24 for rotation relative thereto and is rotated as required to dump bulk material as received from a feed conveyor onto the pile 12. As shown in FIG. 1, the stacker device 38 is fixed to an upper sleeve member 54 that is mounted on a bearing 56. Fixed to the lowermost end of the bearing 56 is a lower sleeve member 58 which is mounted on the upper jib 24. The stacker device 38 is rotatably driven on the bearing 56 and relative to the jib 24 and support column 14 by a motor 59 that is mounted on the frame of the stacker device 38. The motor 59 drives a pinion 60 that engages a ring gear 61 fixed to the upper sleeve member 56 that in turn is fixed to the frame of the stacker device 38. Thus, upon operation of the motor 59, the upper sleeve member 54 and the stacker device 38 mounted thereon are rotated. It is understood, of course, that any convenient drive mechanism may be utilized to rotate the stacker device 38, the just-described pinion and gear drive being only one example of such a conventional mechanism.

The stacker device 38 receives bulk material from an outside source for distribution onto the pile 12 by way of a feed conveyor generally indicated at 62. The feed conveyor 62 includes a support frame 64 in which a conveyor belt 66 of the endless type is mounted. The frame 64 is supported by a mast 68 to which support wires 70 are secured, the support wires being fixed to the frame 64 at convenient locations for supporting the frame 64 in the position as illustrated. The feed conveyor 62 terminates at its outermost end at a location remote from the apparatus 10, at which location the bulk material is deposited onto the conveyor belt 66 for movement to the stacker device 38. The conveyor belt 66 terminates above the stacker device 38 and directs the bulk material conveyed thereon into an upper chute 72 that is suspended below the frame 64. The material is then directed by the chute 72 through a lower hopper 74 onto the trough conveyor 44 of the stacker device 38 for deposit onto the pile 12.

In order to remove the bulk material from the pile 12 for transfer to a remote location, the reclaimer device 40 is provided. The reclaimer device 40 must of necessity be pivotally movable about a horizontal axis to follow the pile 12 as it is depleted and must also be rotatable relative to the column 14 so as to reach all of the areas of the annular dump. Referring again to FIG. 1, the reclaimer device 40 as illustrated includes a cantilevered boom 76 on which an endless conveyor 78 is mounted having spaced flights or rakes (not shown) fixed thereto. End roller 79 and sprockets 80 are mounted adjacent to the ends of the boom 76, the sprockets 80 being drivingly connected to a drive unit motor 90. As is conventional in conveyors of this type, the rakes as attached thereto upon operation of the conveyor move a layer of the bulk material with which the rakes engage to the innermost end of the reclaimer device 40 for deposit into a hopper as will be described.

In order to mount the reclaimer device 40 for rotation relative to the support column 14, the innermost end thereof is mounted on a lower support member 82 by any suitable bracket construction (not shown), the lower support member 82 being rotatable relative to the jib extension 36 by connection to a bearing 87 that is mounted on the extension 36. The lower support member 82 is rotated by a motor drive device 84 that is mounted on an upper support member 86. The upper support member 86 which is an extension of the lower support member 82 is fixed onto a bearing 87 that is carried by the fixed jib extension 36. The motor drive device 84 drives a pinion 88 that in turn engages a ring gear 89 fixed to the bearing 87. Since the upper support member 86 is also rotatable on the bearing 87. The operation of the motor drive device 84 will rotate the pinion gear 88, the ring gear 89 and the upper and lower support members 82 and 86 therewith. It is also seen that operation of the motor drive device 84 that produces the corresponding rotation of the upper and lower support members 82 and 86 will carry the reclaimer device 40 therewith that is mounted on the lower support member 82. As described above, the scraper conveyor 78 of the reclaimer device 40 is independently operated by the motor drive unit 90 that is fixed to the lower support member 82 and is drivingly connected to the sprockets 80 through a drive chain 91. Since the motor drive unit 90 is fixed to the lower support member 82, it will also rotate therewith along with the reclaimer device 40 during the operation thereof.

As previously described, the reclaimer device 40 is pivotal about a horizontal axis, and in this connection is pivotally movable relative to the lower support member 82 as it follows the angle of the dump 12, the pivot axis of the boom 76 being indicated at 92. Although not shown, suitable bearings are located at the pivot axis 92 to permit rotation of the boom 76 about the pivot axis thereof. As described hereinabove, a suitable bracket construction is mounted on the lower support member 82 for receiving the innermost end of the reclaimer device 40 in pivotal relation with respect thereto. The pivotal movement of the reclaimer boom 76 is effected through a winch cable assembly, a motor winch unit 93 being mounted on the upper support member 86 that is carried by the extension 36 of the jib 34. A hoisting cable 94 supported on the motor winch unit 93 extends around an upper pulley 96. The pulley 96 is mounted for rotation on a support bracket 98 that is secured to the lower sleeve member 58 through a bearing 99, the bearing 99 being mounted on sleeve member 58. A swivel arm 102 is secured to the frame of the reclaimer boom 76 and is interconnected to a roller 100 that receives the hoisting cable 94 therearound. As the winch motor unit 93 is operated, the hoisting cable 94 cooperates with the swivel arm 102 to pivotally move the reclaimer device 40 to the desired inclined position that corresponds to the angle of the surface of the pile 12. It is seen that as the motor 84 is operated to produce rotation of the lower and upper support members 82 and 86 relative to the fixed jib 34, the reclaimer device 40 will rotate therewith along with the motor drive unit 90 that drives the conveyor of the reclaimer device 40, the winch motor unit 93 and the cable 94 controlled thereby. As the reclaimer device 40 rotates on the extension 36 of the jib 34, the swivel arm 102 connected to the boom 76 thereof, the hoisting cable 94, cable rollers 96 and 100 and the bracket 98 rotate therewith, the roller 96 and the bracket 98 being rotatable relative to the fixed upper jib 24. Thus, the reclaimer device 40 and those elements interconnected therewith are rotatable relative to the inclined support column 14 and the stacker device 38 mounted thereon.

Located centrally of the annular pile 12 and disposed directly beneath the innermost end of the boom 76 of the reclaimer device 40 is a circular protective conveyor housing 104 having an opening formed in the upper wall thereof in which an open and unobstructed hopper 106 is positioned. The right wall of the protective housing 104 as seen in FIG. 1 is formed with an opening 105 and extending from the protective housing right hand wall is a conveyor housing extension 107 that shields the discharge conveyor 22 that extends therethrough from debris. As described hereinabove, the discharge conveyor 22 projects through the opening 20 in the lower end of the inclined support column 14 and extends outwardly of the annular dump 12 for transfer of the bulk material received thereon to a remote location. It is seen that as the bulk material is moved by the scraper rakes mounted on the conveyor 78 of the reclaimer device 40 toward the innermost end of the boom 76, the bulk material is directed into the unobstructed hopper 106 for deposit on the conveyor 22 for transfer to the remote location for eventual use thereof.

As shown in FIG. 1, the discharge hopper 106 and the lower support member 82 together with the extension 36 of the lower jib 34 are disposed substantially concentric with the axis of rotation of the stacker device 38. It is understood that these units may be located at various positions so as to be eccentric with respect to each other without departing from the spirit of the invention so long as the units are not coincident with respect to the longitudinal axis of the support column 14. However, as will be set forth hereinafter, the stacker device itself may, as required, be located in concentric relation with the support column when the column is disposed in a vertical position.

As will further be described, the apparatus for stacking and reclaiming a bulk material as illustrated in FIGS. 1 and 2 may be modified in accordance with the requirements of use. Since the stacker device 38 and reclaimer device 40 are not directly mounted on the support column 14, and the axes of rotation thereof are not coincident with the longitudinal axis of the support column, the devices are movable relative to the support column in an angular direction that is substantially greater than 180°. It is contemplated that the reclaimer device 40 will be moved to an end position following an angular travel of approximately 310°, whereas the stacker device may be movable through an angle of 360° if necessary. As mentioned above the support column 14 may be located with the longitudinal axis thereof disposed in a vertical position. In this connection, the upper and lower jibs may have to be lengthened to effectively offset the stacker and reclaimer devices relative to the support column.

In FIGS. 3–14, various modified forms of the invention as just described are illustrated. As shown in FIGS. 3–14, the components that define the variations of the subject invention are illustrated in diagrammatic form; and it will be understood that some of the components as described includes a more complete structure that is of a construction well known to those skilled in the art, and therefore further explanation of the details of construction thereof is not considered to be necessary.

Figure 3:
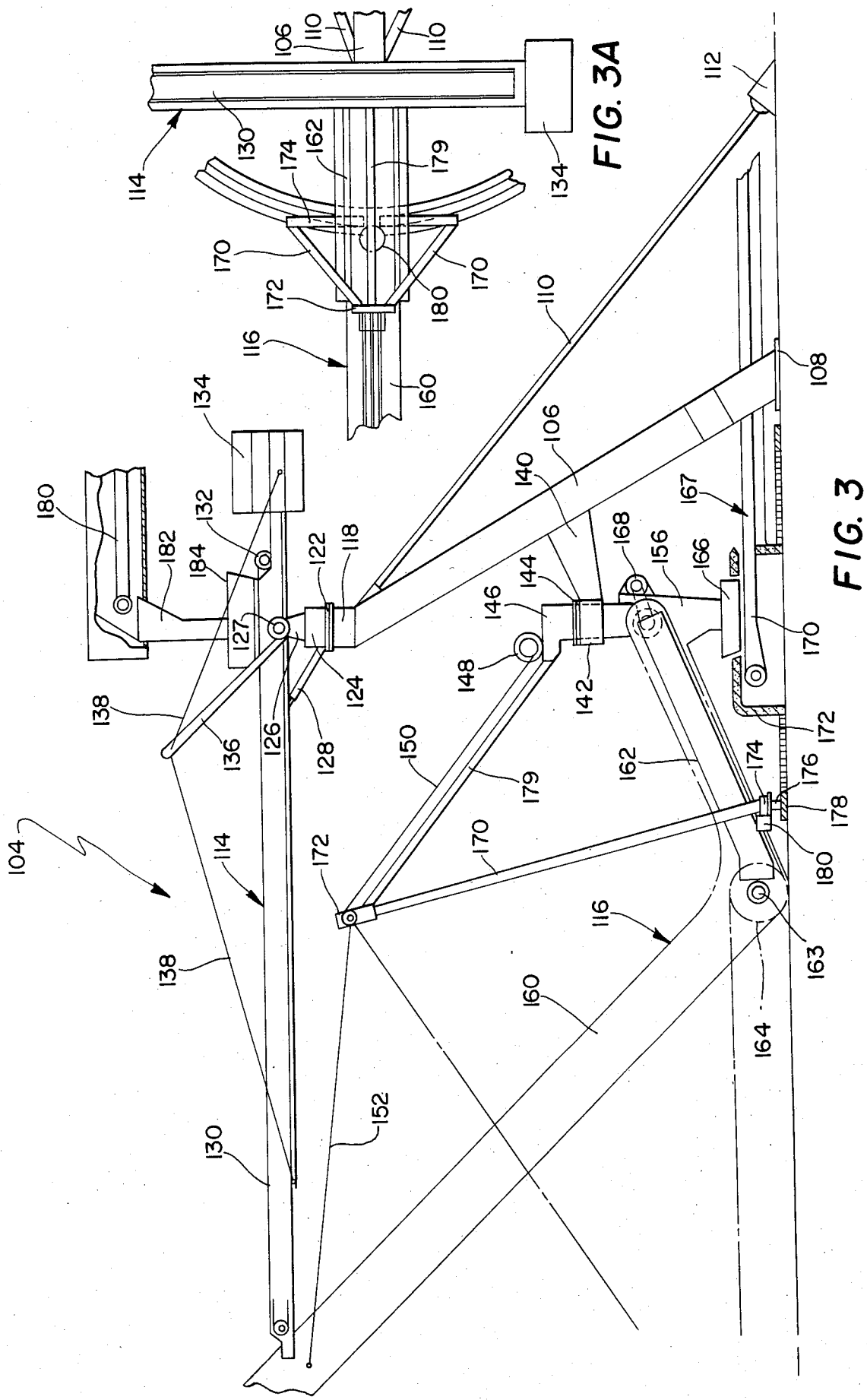
FIG. 3 is a side elevational view of a modified form of the invention.

Referring now to FIGS. 3 and 3(a), a modified form of a unit that includes both a stacker and a reclaimer is illustrated and is generally indicated at 104. The unit 104 as illustrated in FIGS. 3 and 3(a) includes an inclined support column 106 of the type as described hereinabove, the lowermost end of which is received on a concrete foundation 108. Stabilizer rods 110 are interconnected to the uppermost end of the column 106 and are fixed to individual base members 112 in any convenient manner. As will be described, the apparatus 104 includes a stacker device generally indicated at 114 that is mounted for rotation relative to the inclined column 106 and is supported thereby, and further includes a reclaimer device 116 that is mounted for rotation relative to the support column 106 and in the form of the invention shown in FIG. 3 is also supported thereby.

The support column 106 differs from the column 14 described above and shown in FIG. 1, in that the column 106 does not include an upper extension as a jib. Instead the upper end of the column 106 has a sleeve 118 mounted thereon. It is understood that an upper jib may be utilized with the inclined support column in the structure just described or in any of the modified versions of the invention as will be described hereinafter. Mounted on the upper portion of the sleeve 118 is a bearing 122, and secured to the upper race of the bearing 122 is a lower support member 124 that is rotatable relative to the sleeve 118 and the inclined column 106. The stacker device 114 is selectively rotatable by the operation of a drive motor and gear assembly (not shown) similar to that illustrated in FIG. 1, but any conventional arrangement could be utilized for this purpose. Projecting upwardly from the lower support member 124 is a tapered upper support member 126 on which the stacker device 114 is mounted for rotation therewith. The stacker device 114 is also mounted for pivotal movement about a horizontal axis, and for this purpose is pivotally connected to the upper support member 126 through a shaft and bearing assembly indicated at 127. As also shown in FIG. 3, a jacking device 128 of conventional design is interconnected between the frame of the stacker device 114 and the lower support member 124 and is operable to effect the vertical pivotal movement thereof. A motor operated unit (not shown) is operatively controlled to effect movement of the jacking device 128 to produce the required vertical pivotal movement of the stacker device 114 on the upper support member 126.

The stacker device 114 is similar in construction to the stacker 38 shown in FIGS. 1 and 2 and includes a frame 130 in which a trough conveyor is located that is driven by a motor unit (not shown) that, in turn, is drivingly connected to a drive roller 132. Since the stacker device 114 as illustrated in FIG. 3. is relatively elongated in construction, a counterweight 134 is required and is located at the innermost end thereof, a mast 136 having support wires 138 joined thereto being provided for stabilizing of the stacker device in the operation thereof. Rotation of the stacker device 114 is accomplished by utilizing a drive motor (not shown) similar to the drive motor 60 illustrated and described in FIG. 1.

Joined to the inclined support column 106 and extending laterally therefrom is a jib 140 having an extension 142 fixed thereto. A bearing 144 is mounted on the extension 142, and secured to the upper race of the bearing 144 for rotation therewith is the upper end of a frame 146 on which a motor winch unit 148 is mounted. The motor winch unit 148 is operated to control pivotal movement of the scraper reclaimer device 116 through a hoisting cable 150 as will be hereinafter described.

Projecting through the extension 142 is a lower end of the frame 146 that is formed integrally with the upper end thereof. A discharge chute 156 is attached to the lower end of the frame 146, and it is seen that the reclaimer device 116 that is interconnected to the lower end of the frame 146 delivers bulk material to the chute 156 for discharge to a remote location.

The reclaimer device 116 in the form of the invention as illustrated in FIGS. 3 and 3(a) includes an elongated boom 160 that is connected to a fixed arm 162 by a shaft and bearing assembly 163 for pivotal movement relative thereto. A scraper conveyor is mounted for continuous movement on the boom 160 and fixed arm 162, guide rollers 164 providing for movement of the scraper conveyor around the pivot point therebetween. The boom 160 and the fixed arm 162 cooperate to receive the scraper conveyor and the rakes secured thereto that transfer the bulk material from a pile to the chute 156 that is located at the uppermost end of the arm 162. The chute 156 directs the bulk material received from the reclaimer device 116 into a hopper 166 that is mounted on a conveyor structure generally indicated at 167. As shown in FIG. 3, a motor unit 168 is also mounted on the lower portion of the frame 146 for movement therewith and is operably connected to the scraper conveyor through a chain drive for selectively producing movement thereof and the scraper rakes attached thereto for reclaiming the bulk material from the pile for transfer to the chute 156 and hopper 166. A conveyor belt 170 is mounted on the conveyor structure 167 and extends through an opening in a conveyor housing 172, the conveyor belt 170 receiving the bulk material from the hopper 166 for the transfer thereof to a remote location as previously described.

It is contemplated that the unit 104 shown in FIGS. 3 and 3(a) will carry relatively heavy loads during the operation thereof. In order to properly support the reclaimer device 116 during the rotating movement thereof and to assist the inclined support 106 in withstanding the additional heavy loads, support members 170 are provided and define an A-frame configuration that are interconnected at the upper ends by an upper connecting member 172. Each of the support members 170 are joined at the lowermost ends thereof to a lower support beam 174 (FIG. 3a) that carries one or more rollers 176 on the lowermost end thereof. The rollers 176 rest on a rail 178 that is circular in configuration and that conforms to the angular movement of the rollers 176 during the rotating movement of the reclaimer device 116. Although not specifically illustrated with respect to the details thereof, the arm 162 of the reclaimer device 160 is carried by the lower support beam 174 and is supported thereby together with the support members 170 for rotating movement. The uppermost ends of the support members 170 are held in place by a tie rod 179 that connects the connecting member 172 to the upper end of the frame 146 and that is rotatable relative to the extension 142 and inclined support column 106. It is also contemplated that the tie rod 179 be secured to a bracket and bearing assembly located at the uppermost end of the support column 106 when circumstances require a different distribution of loads. An example of such a bracket and bearing assembly is illustrated at 98 and 99 in FIG. 1. As previously described, a hoisting cable 150 is connected to the motor winch unit 148, and is also interconnected to the boom 160 of the scraper reclaimer device 116 adjacent to the outer end thereof. Such a connection may take the form as illustrated in FIG. 1 and described hereinabove, and it is seen that operation of the motor winch unit 148 will produce a pivotal movement of the boom 116 relative to the fixed arm 162 around the pivot axis 163.

In order to produce the rotating movement of the reclaimer device 116, including the arm 162 and to also effect the accompanying rotating movement of the frame 146 and the chute 156, a motor drive unit indicated at 180 is provided and is operatively interconnected to the wheels 176 in any convenient manner to drive the wheels 176 around the track 178. As the support members 170, tie rod 179 and accompanying framework move with the wheels 176 on the track 178, the reclaimer device 116, including the arm 162 and frame 146 move as a unit therewith.

In the operation of the apparatus as illustrated in FIGS. 3 and 3(a), the stacker device 114 is rotatable on the bearing 122 as mounted on the inclined support column 106 to direct bulk material to a pile. For this purpose, a feed conveyor 180 is located above the stacker device 114 and directs the bulk material in the conventional manner to the conveyor of the stacker device 114 by way of a chute 182 that communicates with a hopper 184 mounted on the stacker device. Since the axis of rotation of the reclaimer device 116 is not coincident with respect to the axis of the support column 106, the reclaimer device 116 is rotatable through an angle of substantially greater than 180° and up to approximately 310. The angle of rotation of the stacker device 114 is limited only by the location of the feed conveyor 180 relative therto. Although the support column 106 is inclined as illustrated and described in FIG. 3 and as also illustrated in FIG. 1, it is understood that a vertical column can be utilized in place thereof, provided that the jib connected thereto supports the structure for mounting the reclaimer device such that the axis thereof is not coincident with respect to the axis of the column 106.

Referring now to FIG. 4, another version of the apparatus as embodied in the subject invention is disclosed. As shown in FIG. 4, an inclined support column 186 is mounted on a foundation 188 and is retained in position by stabilizers 190 that are fixed to a ground support 192 and to a bracket 194 located at the uppermost end of the support column 186. As contrasted with the units illustrated in FIGS. 1 and 3, the support column 186 supports essentially a stacker device generally indicated at 198. As will be described, the column 186 does help to support the reclaimer device through the hoist cable thereof. The stacker device includes a conveyor (not shown) mounted in a framework 200. A drive roller 202 carried by the framework 200 is rotated by a drive motor (not shown), and this structure is similar to that more clearly illustrated in FIG. 1. The stacker device 198 is fixed to an upper collar 204 that is mounted on a bearing 206 for rotation therewith, the lower portion of the bearing 206 being received on a sleeve 207 that is fixed to the bracket 194 of the column 186. Thus, the stacker device 198 is mounted on the support column 186 for rotation relative thereto. A motor drive device (not shown) and similar to that described in connection with the unit illustrated in FIG. 1 selectively rotates the stacker device 198 as required. In order to pivotally adjust the stacker device 198, a jacking device 208 is provided and is operatively movable to pivotally adjust the stacker assembly relative to the collar 204. In this connection, the stacker device 198 is pivotally mounted on the upper collar 204 by a shaft and bearing assembly previously described in connection with FIG. 3. A feed conveyor 210 is mounted in a frame 212 that is supported by a pedestal 214 and directs incoming bulk material to a feed chute 216 and hopper 217 for depositing the bulk material into the trough conveyor of the stacker device 198. It is further contemplated that the feed conveyor frame 212 be supported by the column 186, in which case the pedestal 214 would be mounted directly on the support column 186 or, as will be described, the feed chute would be supported by the stacker device 198 through a suitable bearing assembly.

In the form of the invention as shown in FIG. 4, a reclaimer device generally indicated at 218 is supported on a vertical column 220 for rotation therewith relative to the inclined support column 186. The vertical column 220 is mounted on a bearing 222 that is carried by a foundation 224, the vertical column 220 thereby being rotatable relative to the foundation 224. The vertical column 220 is rotated by a motor drive unit 225 that is mounted on the vertical column 220 and through a pinion engages a ring gear 226 mounted on the foundation 224. An alternate drive for rotating the vertical column 220 that is similar to the drive described in FIG. 3 for rotating the frame 146 and reclaimer device 116, may also be substituted for the motor drive unit 225 and ring gear 226. In this connection, the alternate drive would be attached to an extension arm 232 of the reclaimer device 218. An upper bracket 227 is mounted on the vertical column 220 and carries a motor winch unit 228 thereon. The reclaimer device 218 includes a boom 230 that is pivotally connected to the extension arm 232 at a pivot connection 233 which is described in connection with FIG. 3. The extension arm 232 is mounted on the vertical column 220 by a bracket 234, and a motor drive unit 236 that is carried by the bracket 234 is also drivingly interconnected to end conveyor sprockets 237 of the extension arm 232 for driving the endless conveyor that is operably movable in the boom 230 and extension arm 232. A hoisting cable 238 is operated by the motor winch unit 228 and extends over a sheave 240 rotatably secured to a bracket 242 for connection to a swivel arm 239 for pivotally moving the boom 230 of the reclaimer device 218. The bracket 242 is mounted on a bearing 243 fixed to the sleeve 207 that allows for relative rotation of the bracket 242 with respect to the support column 186. As the reclaimer device 218 is rotated relative to the foundation 224, the cable 238 moves therewith relative to the column 186. It is contemplated that when circumstances require that the load from the reclaimer winch cable sheaves 240 be removed from the inclined support column 186, an arrangement similar to that of FIG. 3 will be utilized, whereby an A-frame as defined by the support members 170 and connecting member 172 will be incorporated into the structure in FIG. 4 and will connect to the extension arm 232. In this modification, a tie rod 179 will also be connected to the A-frame and to the vertical column 220. A hopper 244 which may be fixed relative to the vertical column 220 is located on the foundation 224 and receives material from the extension arm 232 of the reclaimer device 218 for deposit through the bearing 222. The hopper 244 communicates with a discharge conveyor 246 that extends through the foundation 224 for directing the material thereto.

It is seen that the reclaimer device 218 and the stacker device 198 are both rotatable relative to the inclined support column 186 substantially more than 180°, the inclined column 186 also functioning to support the stacker 198 while the vertical column 220 on which the reclaimer device 218 is mounted is supported on the foundation 224 for rotation relative thereto. It is also seen that the hopper 244 is unobstructed and directly receives the material as deposited thereon by the conveyor located in the extension arm 232 of the reclaimer device 218 for deposit onto the conveyor 246.

In FIG. 5 a variation of the apparatus as illustrated in FIG. 4 is disclosed, and differs essentially therefrom by the elimination of the extension arm 232 of the reclaimer device 218. The boom 230 of the reclaimer device 218 is pivotally connected to the bracket 234 of the vertical support 220 at the innermost end of the boom in any convenient manner, the boom 230 of the reclaimer device 218 thus transfering the bulk material from the pile directly through the bearing 222 and into the hopper 244 located within the foundation 224 for deposit onto the discharge conveyor belt 246. As also shown in FIG. 5, a protective wall 247 is employed for preventing the bulk material from spilling into the discharge conveyor area.

FIG. 6 illustrates a variation of a discharge hopper that is employed with the equipment illustrated in both FIGS. 4 and 5. In this connection, the innermost end of the reclaimer device 218 is mounted on a bracket 248 and is located in spaced relation with respect to the vertical column 220. The bracket 248 and the reclaimer device 218 are rotated with the vertical column 220 in the manner as described above relative to the apparatus shown in FIG. 4. Located below the reclaimer device 218 is a retaining wall 250 that prevents the bulk material from spilling into the conveyor area. A fixed foundation support member 252 having a laterally extending offset portion 254 is spaced from the retaining wall 250, the laterally extending offset portion 254 providing a support for the bearing 222 on which the vertical column 220 rotates. A discharge chute 256 is fixed to the retaining wall 250 and/or the fixed support member 252 and receives material from the conveyor of the reclaimer device 218 for directing the material into a hopper 258 located above a discharge conveyor 260. Thus, in the form of the hopper arrangement illustrated in FIG. 6, the bulk material is discharged exteriorly of the lower bearing 222 and is directed to the hopper 258 by way of the discharge hopper 256.

In FIG. 6(a) another variation of the discharge hopper as shown in FIG. 1 is illustrated, and in this form of the invention, the boom 76 of the reclaimer device 40 is mounted at the inner end thereof on the lower support member 82 for rotation therewith. The conveyor housing 104 has an inclined upper portion 263 which acts to prevent bulk material from spilling into the discharge conveyor drive area. A discharge chute 264 is mounted on the lowermost end of the support member 82 for rotation therewith and receives the bulk material as directed thereto from the innermost end of the boom 76 for discharge into a hopper 266 supported above the conveyor 22 for deposit thereon. It is understood that in all versions of the apparatus as shown in FIGS. 1-6(a), the discharge hopper and chutes in all combinations thereof are free and unobstructed for receiving the bulk material directed thereto by their respective reclaimer devices 218 and for depositing the bulk material onto a discharge conveyor.

Referring now to FIG. 7, a still further modified form of the invention is illustrated; and in this form of the invention, as will be described hereinbelow, the stacker and reclaimer devices are combined into a single unit. In this version of the invention, the construction permits either a stacking or reclaiming operation, but not both simultaneously. As previously described above in connection with the other forms of the invention, an inclined support column 270 is provided in FIG. 7 for effectively supporting the structural elements of the apparatus, the support column 270 resting on a foundation 272 and being supported by stabilizer bars 274. The stabilizer bars 274 are equivalent in structure to the stabilizer wires 26, 110 and 190 as previously described above in FIGS. 1, 3 and 4, respectively, and are secured to a foundation 276 in any convenient manner. Fixed to the uppermost end of the inclined support 270 is an upper jib 278 on which a bearing 279 is mounted. A structural ring 280 is mounted on the bearing 279 for rotation relative to the jib 278. In order to feed the bulk material to a pile 281, a feed conveyor 282 is provided and is mounted in a frame 284 that is supported by a mast 286. The feed conveyor 282 directs the bulk material into a feed chute 288 fixed to the underside of the frame 284 for introduction into an upper spout 290. The bulk material then passes through the spout 290 which extends through a central opening in the bearing 279 and structural ring 280 and then through an axial opening in the extension of the upper jib 278 to a lower spout 294.

A lower jib 296 that is fixed to the inclined support column 270 is formed with an extension on which a bearing 298 is mounted. A support sleeve 300 is mounted for rotation on the outer race of the bearing 298 with respect to the jib 296 and receives an upper support bracket 301 thereon. An opening is formed in the upper support bracket 301 for receiving the lowermost end of the upper spout 290; and also fixed to the upper support bracket 301 is the uppermost end of the lower spout 294 that is offset relative to the support sleeve 300. Extending through the extension of the jib 296 and rotatable with the bearing 298 on which the support sleeve 300 is mounted is a circular frame 306 to the lowermost end of which a combination stacker-reclaimer device generally indicated at 308 is pivotally secured. The combination stacker-reclaimer device 308 includes an elongated boom 310 that is pivotally secured to a lower support bracket 312 that is carried by the circular frame 306. A motor drive unit 314 is also mounted on the lower support bracket 312 and is operatively connected through a chain drive to drive sprockets 315 for operating a conveyor 316 of the boom 310. As shown, the conveyor 316 includes spaced rakes 313 that are pivotally arranged so as to form a floor when material is received from the spout, and to act as conventional rakes when the unit is reclaiming the material from a pile in a manner as previously described. A motor drive unit (not shown) is mounted on the circular frame 306, and through a pinion ring gear assembly of the type previously described in connection with FIG. 1, selectively rotates the circular frame 306, the stacker-reclaimer device 308, the support sleeve 300, upper support member 301, spout 290 and offset spout 294 therewith.

Communicating with the offset spout 294 is a receiving hopper 317 through which the conveyor 310 of the combination unit 308 runs. An extension of the hopper 317 indicated at 318 having reduced sides relative thereto is located adjacent to the hopper 317 and also receives the conveyor 316 of the combination unit 308 therein. An appropriate opening is formed in the lower wall of the hopper extension 318 for discharge of the bulk material therethrough onto the pile 281. The combination stacker-reclaimer unit 308 is pivotally mounted relative to the circular frame 306 about a horizontal pivot axis 319 as described hereinabove; and in order to produce the pivoting movement of the combination unit, a motor winch unit 320 is provided. As shown in FIG. 7, the motor winch unit 320 controls the movement of a hoisting cable 321 that is received about a sheave 322 that is located on the structural ring 280. The cable 321 is conveniently connected to the boom 310, and upon operation of the motor winch unit 320, the boom 310 is pivoted to the required angular position of the pile of the bulk material 281. Located below the innermost end of the combination stacker-reclaimer unit 308 is a conveyor housing 323 into which a discharge conveyor 324 extends. A hopper 326 is mounted within the conveyor housing 323 and receives the bulk material therein as discharged from the innermost end of the combination stacker-reclaimer unit 308 for deposit onto the conveyor 324.

It is seen that the apparatus as illustrated in FIG. 7 avoids the use of a separate stacker device and incorporates a combination unit 308 to perform the function of not only providing for stacking of the material onto the pile 281 by directing the material through the spout 290, offset spout 294 and receiving hopper 317, but also for removing the material for discharge into the discharge hopper 326 and onto the discharge conveyor 324. In this regard then, the combination unit 308 has an economic advantage. As shown, the rotation axis of the combination unit 308 is disposed such that it is not coincident with the axis of the inclined support column 270. Thus, the combination unit 308 is movable well beyond 180°, and in normal operation can be expected to move through a radial angle of more than 300°. Since the stacking or reclaiming operation is independently carried out by the unit 308, the permitted radial movement of the boom 310 is more than sufficient to perform either operation.

In FIG. 8, a combination stacker-reclaimer device is also illustrated, but as contrasted with the combination unit 308 as just described in connection with FIG. 7, the stacking and reclaiming operation as performed by the unit in FIG. 8 can be carried out simultaneously. Referring now to FIG. 8, an inclined support column 328 is provided that is fixed in a foundation 330 and is reinforced by stabilizers 332 as hereinabove described. An upper jib 334 joined to the support column 328 supports on the upperside thereof on which a tubular sleeve 338 is mounted. A structural ring 340 is fixedly mounted on the tubular sleeve 338 and carries a sheave 341 over which a hoisting cable 342 extends for connection to the combination unit as will be described. A feed conveyor 344 feeds bulk material through the tubular sleeve 338 and into an offset spout 343 that is fixed to the lower end of the tubular sleeve 338. The spout 336 then directs the bulk material into a hopper 346. Fixed to the support column 328 and extending laterally with respect thereto is a lower jib 348. Mounted on the lower jib 348 is a lower frame member 350 on which a bearing member 351 is located, the bearing member 351 supporting an upper frame member 352 for rotation relative to the fixed lower frame member 350. A motor drive unit (not shown) is mounted on the upper frame member 352 and is connected to a pinion ring gear asembly (not shown) for producing selective rotation of the upper frame member 352 and the components carried thereby as will be described.

The combination stacker-reclaimer device, only a portion of which is illustrated in FIG. 8 is generally indicated at 356 and includes an elongated boom 357 that carries the hopper 346 and a motor winch unit 360 thereon. The innermost end of the stacker-reclaimer boom 357 is mounted on the upper frame member 352 as previously described for rotation therewith, and is also pivotally mounted about a horizontal axis as will be further described hereinabove. A motor unit (not shown) is also mounted on the upper frame member 352 for drivingly engaging drive sprockets of the stacker-reclaimer device 356 for operating a trough conveyor 361 that is movable mounted in the elongated boom 357.

It is seen that the spout 334 that receives bulk material from the feed conveyor 344 directs the material into the receiving hopper 346 of the combination unit 356 for deposit on the trough conveyor 361 when the unit is used as a stacker. The material is then deposited on a pile by the conveyor 361. The motor winch unit 360 is operable to pivotally move the combination unit 356 as the bulk material is deposited on the pile or as the material is reclaimed. Although not shown, the spout 343 is preferably telescopically constructed and pivotal so as to move and expand or contract in accordance with the location of the boom 357. When the material is to be reclaimed, the conveyor 361 of the combination unit 356, which carries pivotal rakes (not shown) thereon, is then operable to direct the material inwardly toward a center discharge or reclaimer element 362 and exteriorly of the lower frame member 350. As shown more clearly in FIG. 8(a), the center discharge element or reclaimer device 362 is independently rotated relative to the rotational movement of the unit 356, and for this purpose a motor drive unit generally indicated at 363 is provided and is fixed to the interior wall of the frame member 350 by a bracket 364. The motor drive unit 363 drives a pinion 365 that drivingly engages a ring gear 366 for producing rotation thereof. Secured to the ring gear 366 is a carriage 367 on which the reclaimer element 362 is carried for rotation with the ring gear 366. In order to rotate the reclaimer element 362 on its own axis to direct material inwardly toward a discharge area, a motor 368 fixed to the ring gear 366 drives a shaft 369 through a gear reducer 370, the shaft 369 being drivingly connected to the reclaimer element 362 to produce the rotating movement thereof. It is seen that the center reclaimer element 362 is rotatable about the axis of the support 350 and scrapes and moves the material into a chute 371 that is attached to the center discharge element 362. A conveyor 373 receives the material that is directed through the chute 371 by the reclaimer element 362, a hopper 372 that is mounted on the frame of the conveyor 373 directing the material onto the belt of the conveyor 373 as required. The conveyor 373 then conveys the material to a remote location. Since the reclaimer element 362 is separately rotated by the motor drive unit 363 and rotated on its own axis by the motor 368, the flow of material into the spout 371 and onto the conveyor 373 can be effectively metered and controlled as required.

As previously described, the unit 356 is normally used for either stacking or reclaiming but not both simultaneously, and therefore stacking and reclaiming can be carried out simultaneously only when the unit 356 is used for stacking and the reclaimer element 362 is operated to reclaim the material. If desired, the structure illustrated in FIG. 8 can be modified to provide a separate stacker device as previously described, in which case the boom 357 and reclaimer element 362 would cooperate together to reclaim the material. This is particularly useful in cold weather areas where the exterior surface of the pile tends to freeze and the use of the reclaimer element 326 provides for withdrawing the material from beneath the pile to effectively break up the exterior frozen portions thereof. Mounting of a separate stacker on the support 328 would of course require removal of the spout 343 and hopper 346. As further shown in FIG. 8, the pivot point of the reclaimer boom 357 is located relatively high on the frame 350, which allows the reclaimed material to effectively flood around the reclaimer element 362 as dropped thereover by the reclaimer conveyor 361.

FIG. 9 illustrates a simplified version of the concept of the invention and includes a stacker device 374 that is mounted for rotating movement on a bearing 375 that is supported by a sleeve 376. The sleeve 376 is mounted on a bracket 377 that is secured to the uppermost end of an inclined support column 378. Stabilizers 379 are employed for supporting the column 378 in the inclined position thereof as hereinabove described. Bulk material is fed to the stacker 374 by a feed conveyor 380 that is located in a frame 382 supported by a mast 384. A feed spout 386 directs the bulk material into a hopper 388 carried by the stacker 374. The stacker 374 is rotated relative to the column 378 by a motor drive unit (not shown) that is interengaged to a gear (not shown) located on the sleeve 376. The stacker conveyor is operated in the conventional manner by a motor drive unit (not shown) mounted on the frame of the stacker 374.

In order to reclaim the material deposited in a pile by the stacker 374, a screw reclaimer 389 is located adjacent to the support column 378 but is offset therefrom and is driven by a drive unit enclosed in a housing 390 in a sweep and rotating motion and is similar to the drive unit as described in connection with the structure illustrated in FIG. 8(a). The housing 390 is mounted on a bracket 393 that is supported by foundation 394. A hopper 391 located beneath the innermost end of the screw reclaimer 389 receives the reclaimed material therefrom and directs it to a below-the-ground discharge conveyor 392. As previously described, the screw reclaimer 389 is useful in reclaiming a significant portion of the pile without assistance, and in so doing, effectively meters the flow of material to the discharge hopper 391.

In the simplified version of the invention as shown in FIG. 9, the material as located at the pile can be moved by conventional earth moving equipment such as a bulldozer (not shown) inwardly within the reclaiming area of the screw conveyor 389 for deposit onto the discharge conveyor 392. In use, since a bulldozer may accumulate the material, the screw conveyor 392 also has the advantage of metering the flow of the bulk material onto the discharge conveyor 392 which would normally be necessary because of the bulk supply to the reclaiming area by the bulldozer. In this form of the invention, since the reclaiming operation includes the use of mobile equipment, such as a bulldozer, it is possible to easily reclaim material that is spread over a wide area.

It is also contemplated to incorporated a reclaimer device (illustrated in phantom) into the structure shown in FIG. 9, and by so doing external equipment such as a bulldozer would not be required to move the bulk material located at the pile and beyond the reach of the screw conveyor 389 thereto. In this connection, a reclaimer device 395 is pivotally mounted on a support member 396 that is, in turn, supported on a jib 397 by a bearing member 399. A winch motor 401 controls a cable 403 for the pivotal movement of the reclaimer device 395, and a suitable drive motor unit (not shown) is operable to rotate the reclaimer device relative to the support member 378 as required. It is seen that the reclaimer device 395 is operable to feed the bulk material to the screw conveyor 389 which directs it to the hopper 391 as previously described.

Figure 10:
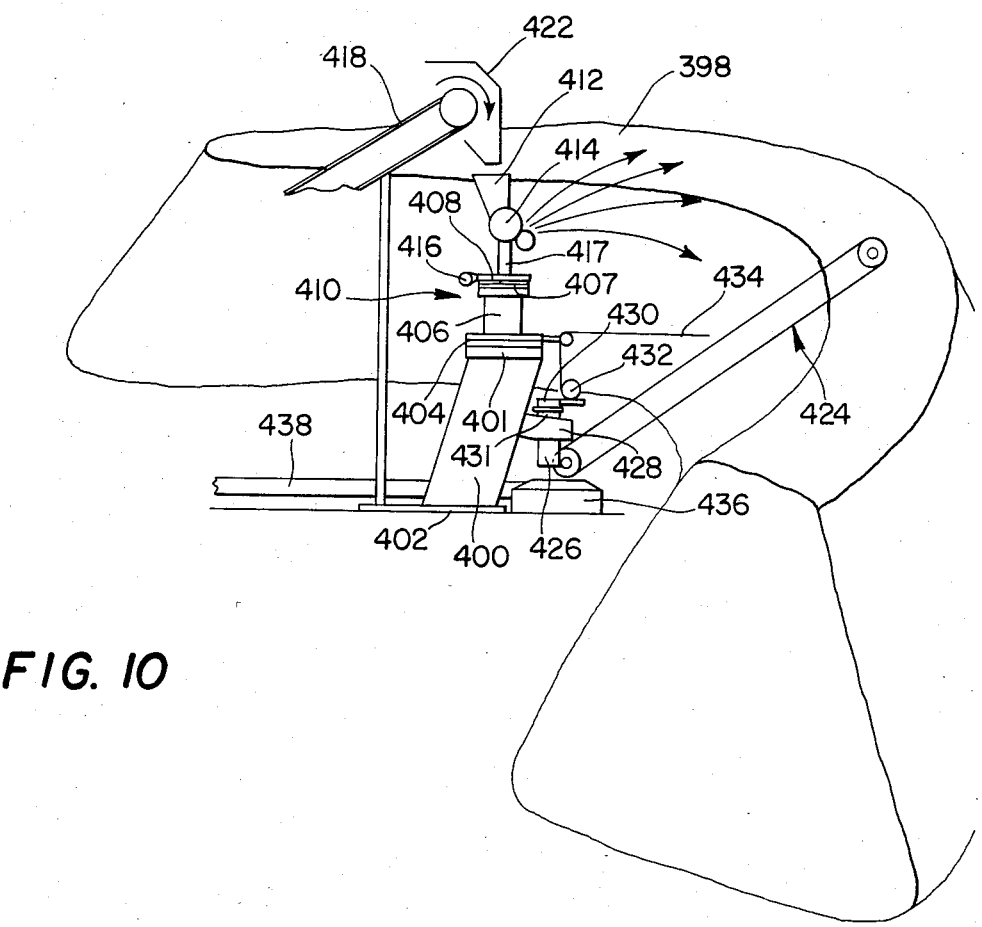
FIG. 10 is diagrammatic representation of a form of the invention in which a material slinging device is utilized to build up a pile of bulk material, a reclaimer device being mounted on a stationary inclined column for reclaiming the bulk material from the pile.

Referring now to FIG. 10, another form of the invention is illustrated wherein the conventional stacker device is eliminated and a so-called jet slinging device is employed for distributing the bulk material onto a pile indicated in FIG. 10 at 398. Located adjacent to the pile 398 is an inclined support column 400 that is fixed in a base 402. As shown in FIG. 10, stabilizers as previously described and normally associated with an inclined column in the various forms of the invention are eliminated, although it is understood that such stabilizers can be employed with the inclined support column 400 if required. Mounted on the upper end of the inclined column 400 is a fixed frame 401 on which a rotatable bearing 404 is located. A support member 406 is joined to the fixed frame 402, and mounted on the support member 406 is a bearing 407. Mounted for rotation on the bearing 407 is a support plate 408, a motor drive unit (not shown) that is fixed to the support member 40 being interconnected to the support plate 408 to provide for rotation of the support plate 408 as required. Also mounted on the support plate 408 is a jet slinger device generally indicated at 410 that includes an upper hopper 412 that directs material to a combination roller unit 414 that is drivingly connected to a motor drive unit 416 of the type previously described. A support diagrammatically indicated as a vertical member 417 is fixed to the support plate 408 for mounting the jet slinger 410 in place for rotation therewith. As the material enters the hopper 412 it is directed between the rollers of the roller unit 414 and is dispersed outwardly therefrom as indicated by the arrows. The support plate 408 is rotatable on the bearing 407 to direct the distribution of the material onto the pile 398 as required.

The bulk material is introduced into the hopper 412 by a feed conveyor 418 that is mounted in inclined relation on pedestals one of which is indicated at 420. A drive mechanism (not shown) drives the conveyor in the well known manner. The conveyor 418 transfers the material to a distributing spout 422 located at the uppermost end of the conveyor and supported in any conventional manner thereon. The spout 422 then directs the material into the hopper 412 of the jet slinger device 410. In order to reclaim the material, a reclaimer device generally indicated at 424 is pivotally mounted by any suitable construction on the lower end of a rotatable support column 426. The support column 426 is mounted for rotation on an outwardly extending jib 428, the jib 428 being fixed to the inclined column 400. An upper portion 430 of the support column 426 is mounted on a bearing 431 for rotation relative to the jib 428 in the same manner as hereinabove described. A motor winch unit 432 is fixed to an extension of the upper portion 430 and operates a cable 434 to pivotally move the reclaimer device 424 as the material is reclaimed from the pile. As the reclaimer reclaims the bulk material and directs it inwardly thereof in the conventional manner, the bulk material is deposited in a hopper (not shown) located in a conveyor housing 436, the hopper then directing the material onto a discharge conveyor 438 that transfers the material to a remote location. Although not shown, a motor drive unit operating through a pinion ring gear assembly is mounted on the upper portion 430 in the conventional manner as previously described for rotating the upper portion 430 and the support column 426 therewith. It is seen that the reclaimer 424, upper portion 430 support column 426, together with the motor winch device 432 and the hoisting cable 434 operated thereby are all rotated relative to the inclined support column 400. In the illustration of the invention as shown in FIG. 10, the reclaimer device 424 is operable to reclaim the material from the pile 398 at least within the confines of the pile 398 as distributed, and is rotatable substantially more than 180° if required to accomplish the reclaiming operation.

Figure 11:
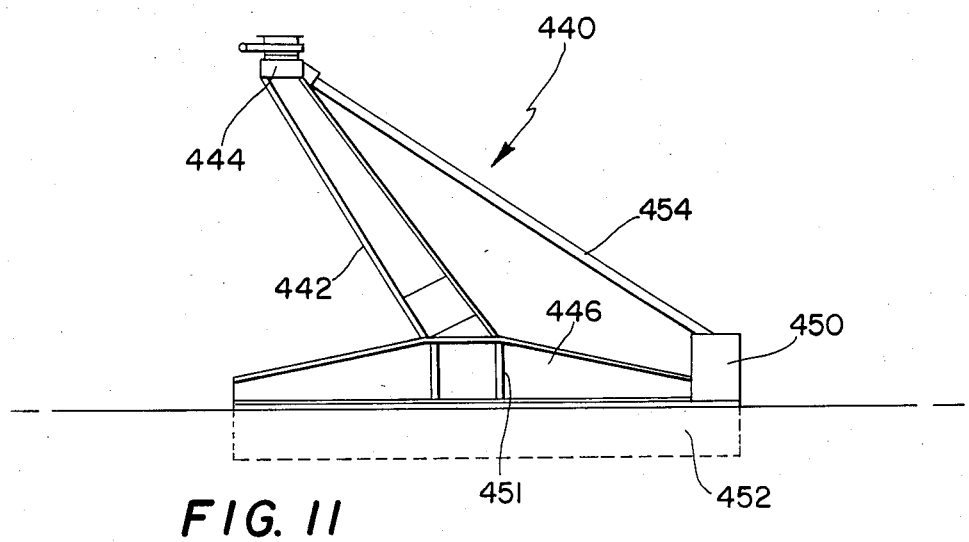
FIG. 11 is a side elevational view showing a modified form of the inclined column as embodied in the subject invention.
Figure 12:
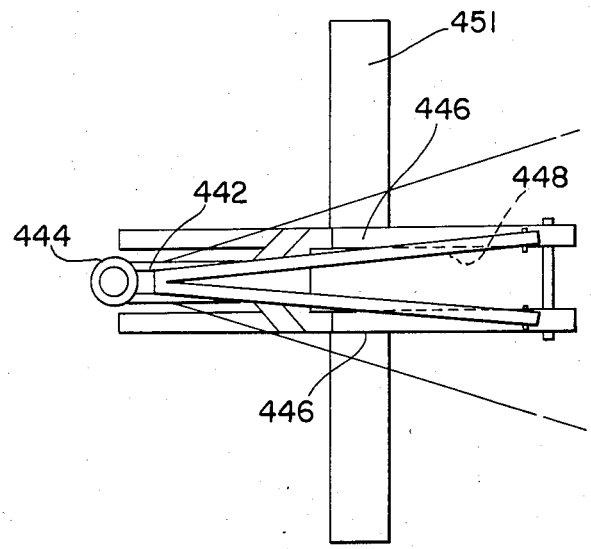
FIG. 12 is a top plan view of the device shown in FIG. 11.

Referring now to FIGS. 11 and 12, another form of an inclined support column is illustrated and is generally indicated at 440. The support column 440, which would normally be employed where loads heavier than normal are to be handled, includes an inclined portion 442 that is fabricated out of structural steel or, if desired, may be formed of reinforced concrete. The configuration of the inclined member 442 is shown more clearly in FIG. 12 and tapers from an upper bracket member 444 downwardly to spaced apart elongated base members 446. The base members 446 terminate at the outermost ends thereof in upper extensions 450. Additional base members 451 extend perpendicular to the base members 446 and cooperate therewith to provide additional stability for the column 442. A foundation 452 as shown in phantom in FIG. 11 may also be provided and transfers the loads from the base members 446 and 551 to the ground. Although the column 440 is designed to be self-sustaining without the use of stabilizers, it is contemplated that spaced stabilizers 454 may also be utilized, the stabilizers extending from the uppermost end of the member 442 for connection to the bracket member 444 and being joined to the upper extensions 450 as indicated in FIG. 12.

As will be understood from a description of the various forms of the invention hereinabove, the support column 440 is designed to receive both a stacker device and a reclaimer device thereon as required. Because of the inclination of the member 442 of the column 440, a reclaimer device as mounted thereon is radially movable more than 180°, and it is contemplated that it may be movable approximately 310°. The type of column and base design as shown in FIGS. 11 and 12 are particularly applicable for carrying large torque and bending moments that would be sustained when a stacker unit and reclaimer device of greater load than usual are mounted thereon. It is also contemplated that a column of the design as shown in FIGS. 11 and 12 be disposed such that the axis thereof extends in a generally vertical direction and may be supported with or without stabilizers. As will be described hereinbelow, the use of a vertical column includes jibs that are joined thereto and extend laterally with respect to the longitudinal axis of the column to a distance that would be sufficient to safely permit the required angular movement of the stacker and reclaimer devices that would be mounted for rotation thereon.

Figure 13:
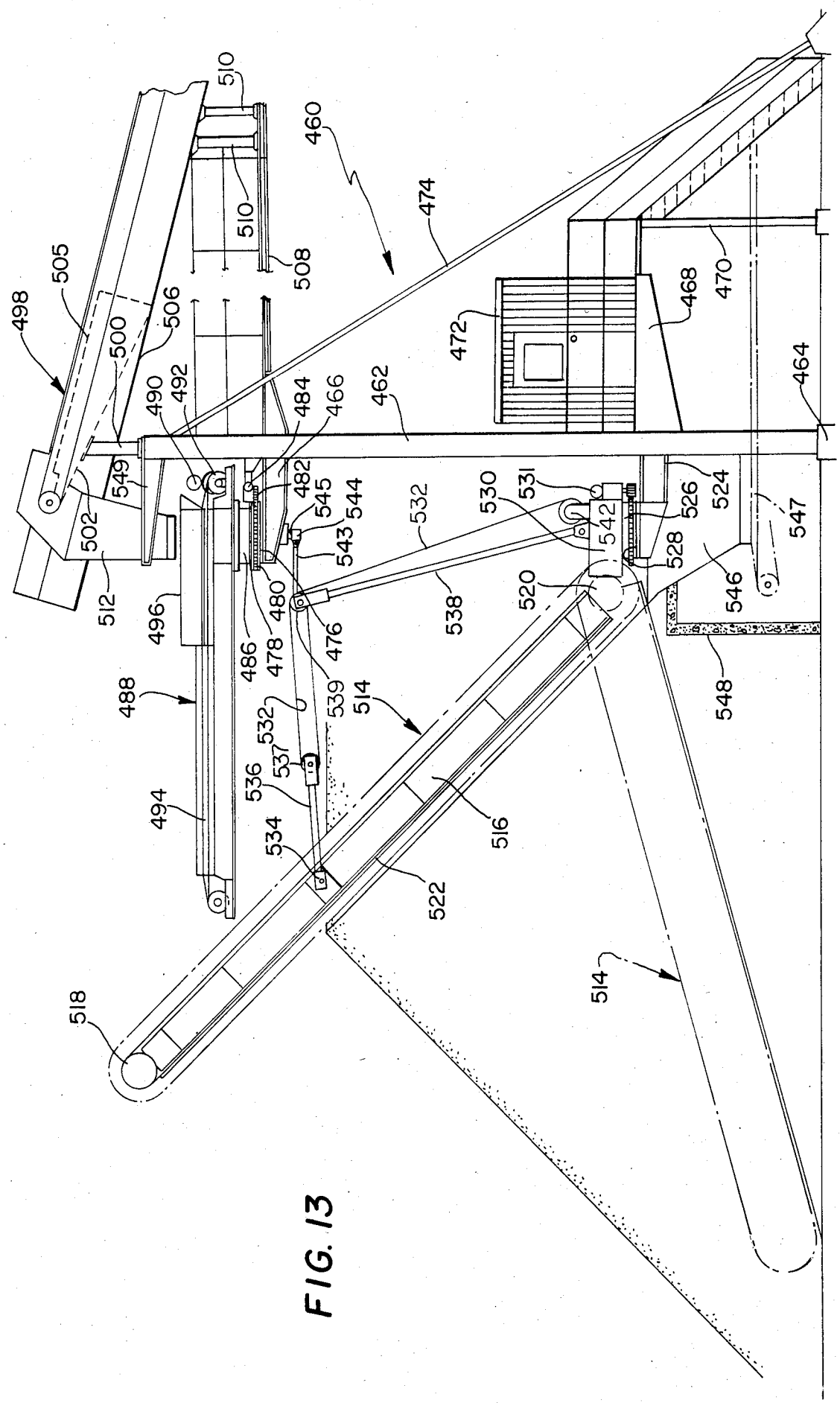
FIG. 13 is an elevational view of a modified version of the subject invention that includes a vertical member as the support column for the stacker device.

Referring to FIG. 13, a still further modified form of a stacker and reclaimer unit is illustrated and is generally indicated at 460. The stacker and reclaimer unit 460 differs from the units previously described by incorporating a vertical support column 462 therein. The vertical support column 462 is mounted on a foundation 464, and fixed thereto adjacent to the upper end thereof is a laterally extending jib 466. A platform 468 is joined to the column 462 adjacent to the lower end thereof and is further supported by a vertical beam 470. The platform 468 supports a small enclosed work station 472, and stabilizer rods 474 extend from the upper end of the column 462 to the ground 468 and help to stabilize the column under load.

Mounted on the jib 466 is a vertical support collar 476, the axis of which is offset with respect to the vertical axis of the support column 462. A bearing 478 is supported by the support column 462 and carries either a ring gear or rack indicated at 480 that is drivingly connected to a pinion 482 that, in turn, is rotated by a hydraulic cylinder or a motor drive unit 484 for rotating a sleeve 486. Mounted on the sleeve 486 for rotation therewith is a stacker unit generally indicated at 488 that is constructed and operated substantially the same as those stackers described hereinabove. For this purpose, a motor drive unit 490 is mounted on the frame of the stacker unit and drivingly engages a roller 492 for operating a conveyor belt 494. Also fixed to the frame of the stacker unit 494 is a hopper 496 for receiving material from a feed conveyor generally indicated at 498.

The feed conveyor 498 may be supported directly on the support column 462 as indicated by the post 500 that supports a subframe 502 in which a feed conveyor 504 travels. A main feed conveyor frame 506 is also supported by the support column 462 through a lateral beam 508 and vertical posts 510, the lateral beam 508 being directly fixed to the support column 462. The material for stacking is directed by the conveyor 504 to a chute 512 for deposit into the hopper 496 and then onto the stacker conveyor 494.

In order to reclaim the material from the pile, a reclaimer device generally indicated at 514 is provided and includes an elongated bottom 516 in which an outer roller 518 and inner sprocket wheels 520 are mounted for receiving a conveyor 522 therearound. Fixed to the vertical support column 462 adjacent to the lower end thereof is a lower laterally extending jib 524 on which a sleeve 526 is mounted. A bearing 528 is carried by the sleeve 526, and mounted on the bearing 528 for rotation therewith is a support block 530. Although not specifically illustrated in FIG. 13, the innermost end of the reclaimer device 514 is mounted on the support block 530 for rotation therewith, wherein the reclaimer device is movable relative to the pile in accordance with the reclaiming requirements. The support block 530 is rotated on the bearing 528 by a motor drive unit 531 such as that illustrated for driving the stacker device 488 and described hereinabove. Pivotal movement of the reclaimer boom 516 is accomplished by operating a hoisting cable 532 that is connected to the boom 516 at 534 and to a yoke assembly 536 that carriers a roller 537. An A-frame assembly indicated at 538 is fixed to the support block 530 and has a cable sheave 539 located at the top thereof for receiving the cable 532 thereon. A motor drive unit 542 is mounted on the support block 530 and is operable to effect movement of the cable 532 to pivotally raise and lower the boom 516. The uppermost end of the A-frame assembly 538 is rotatably supported by a rod 543, an end of which is fixed to a bearing member 544 that is received on a downwardly projecting extension 545 that, in turn, is fixed to the jib 466. The material is discharged from the reclaimer device 514 and is fed into a hopper 546 that is preferably mounted on the vertical support column 462. A conveyor 547 receives the material from the hopper for movement to a remote location. In order to prevent the material discharged from the reclaimer device 514 from filtering onto the conveyor rolers, a protective wall 548 is provided.

As shown in FIG. 13, the vertical support column 462 has a relatively small cross-sectional dimension, but the column nevertheless is capable of carrying considerable loads during the operation of both the stacker and reclaimer devices. Excessive loads can be easily handled by incorporating the stabilizers 474 into the assembly. By providing that the axis of the reclaimer device 514 is not coincident with the axis of the support column 462 and, in effect, is offset therefrom, maximum angular movement of the reclaimer device is possible; and in this connection, the reclaimer boom 514 as illustrated in FIG. 13 is capable of movement of at least 310° from its position of rest.

As further shown in FIG. 13, the feed conveyor 498 is also supported by the vertical support column through the posts 500 and 510. However it is further contemplated to support the feed conveyor on the support column 462 at the chute 512 thereof, and for this purpose a top jib 549 can be provided in which an opening is formed for receiving the chute 512 in support relation. It is also possible to mount the fixed chute 512 directly on the rotatable stacker device 488 through a bearing, in which case the load of the feed conveyor would be transmitted through the stacker device to the jib 466 and the support column 462.

It is seen from a description of the various embodiments of the invention as described herein that the main load carrying column for the stacker device has a center axis that is not coincident with respect to the axis of rotation of the reclaimer device. This construction differs substantially from the conventional apparatus which includes either a stationary framework or a rotating column, the axes of which are concentric with respect to the axes of the stacker and reclaimer devices carried thereby. Thus, in the subject invention, the stacker/reclaimer boom axes are normally arranged concentric to each other but not coincident with respect to the axis of the support column. However, it is also contemplated that the axis of rotation of the stacker and reclaimer be arranged offset with respect to each other, if it is necessary or desirable to provide for such an arrangement.

One of the significant features of the invention is the mounting of the stacker and reclaimer booms for rotation relative to the stationary offset column, which arrangement permits the stacker and reclaimer devices to be rotated substantially more than 180°. Further, the stacker device is rotatable relative to and independently of the reclaimer device. In this connection the booms thereof can pass each other as the stacker boom passes over the reclaimer boom. The stacker and reclaimer devices as described hereinabove consist generally of structural boom frameworks having connecting structures to link each of these devices independently to a stationary support by means of bearing members. As a result of this arrangement, it is seen that the weight of the rotating devices is considerably decreased, which from an economic point of view is quite desirable, since the overall cost of the apparatus is reduced substantially in comparison to conventional prior known units. The unique structural arrangement also simplifies the bearing arrangement, and not only reduces the overall cost of the unit, but allows maintenance and repairs to be performed with a minimum of effort.

In all of the variations of the subject invention, the discharge of the material, because of the unique arrangement of the offset support column, is virtually unobstructed. This provides for deposit of the bulk material into the hopper without obstruction therein, and the bulk material may be rapidly transferrred from the reclaimer device through the hopper and onto the discharge conveyor means without interference.

The unique arrangement of the inclined support column and the stabilizers represent a radical departure from known apparatus, and it is seen that the transfer of loads through the support column and stabilizers enable the system to carry all of the normally required loads experienced as contrasted with comparable equipment now available. It is also seen that the winch and reclaimer boom suspension system may not require a mast or tie rod, and this could also reduce the overall structural elements required in the complete system. Since the support column and stabilizers distribute the loading carried by the unit, additional savings can be effected.

In the subject invention, large rotating platforms are no longer needed. The electrical system is also relatively simple, and as a result power and control cable feed-ins are easily installed. In other systems, rotating suspension or supporting structural framework was necessary if an unobstructed discharge hopper was to be obtained. In the subject invention, the suspension or supporting framework is stationary but still enables an unobstructed reclaiming discharge system to be obtained. In some of the stationary column systems that were known heretofore, if the reclaimer device or stacker device were to rotate more than 180°, the stationary column required that it be supported by ribs or spokes located above and extending to the hopper or have openings in the column itself to enable the reclaimed material to be discharged onto the discharge conveyor. The subject invention avoids such objectionable constructions, and provides a relatively simple unobstructed discharge system that enables the bulk material to be transferred directly onto the discharge conveyor. Finally, the weight of the stacker device and the loads as imposed thereby are not directed through the reclaimer device bearing structure or railway wheels such as employed in the prior known devices, so as to be carried by the framework thereof, but rather in the subject invention the loads are transmitted from the stacker device through the offset support column to the foundation thereof for absorption thereby.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Apparatus for handling bulk material as located in a pile at a circular storage site therefor, comprising a support column located adjacent to said pile of bulk material, means for anchoring said support column in a fixed position, means for stacking said bulk material on said pile, said stacking means being mounted on the uppermost end of said support column and being wholly supported thereby, means for rotating said stacking means relative to said support column to enable said stacking means to stack said material in a substantially circular array at said storage site, means supported above said stacking means for feeding said material to be stacked thereto, said material being reclaimed from said pile in a reclaiming operation in a manner that provides for rotation of a member utilized for reclaiming about a vertical axis for reaching the array of material at said storage site, means for rotatably supporting the member utilized for reclaiming, said reclaimer supporting means being located such that the vertical axis thereof is not coincident with the longitudinal axis of said support column wherein said member utilized for reclaiming is rotatable about the vertical axis thereof through a range of 0° to about 310° without interference with said support column.

2. Apparatus as claimed in claim 1, the longitudinal axis of said column extending substantially in a vertical direction.

3. Apparatus as claimed in claim 1, the longitudinal axis of said column extending substantially in a direction that is inclined to the vertical.

4. Apparatus as claimed in claim 3, the member utilized for reclaiming including a reclaimer device that is mounted on said support column such that the vertical axis thereof is offset with respect to the longitudinal axis of said support column, means interconnected to said support column and supported thereby for mounting said reclaimer device for pivotal movement, wherein the axis of the pivot connection of said mounting means of said reclaimer device is substantially horizontal, said reclaimer device being pivotally movable about the horizontal axis to compensate for the varying gradation of the pile of said bulk material as the bulk material is removed from said pile by said reclaimer device.

5. Apparatus as claimed in claim 4, a hopper located adjacent to said reclaimer device and being disposed with an unobstructed opening at the upper end thereof for receiving said bulk material therein as discharged thereto by said reclaimer device.

6. Apparatus as claimed in claim 4, said stacking means including a stacker device that is mounted for rotating movement on said column for delivering bulk material to said pile and being independently rotatable relative to said reclaimer device.

7. Apparatus as claimed in claim 4, said anchoring means including one or more stabilizing members, one end of each stabilizing member being secured to said column adjacent to the upper end thereof and the other end of each stabilizing member being secured to a ground engaging anchoring member, said stabilizing members being subjected to loads mainly in tension while said column is subjected to loads mainly in compression when either the reclaimer or stacking means is rotated and/or pivoted relative to said column.

8. Apparatus as claimed in claim 7, a support jib secured to said column and projecting outwardly from said column in lateral relation with respect thereto, said reclaimer device having an elongated boom, said bearing member being mounted on said jib for supporting the elongated boom of said reclaimer device in rotating relation and in offset relation with respect to said support column.

9. Apparatus as claimed in claim 7, a discharge hopper located adjacent to the innermost end of said reclaimer device and having an unobstructed opening at the upper end thereof for receiving said bulk material as discharged thereto by said reclaimer device.

10. Apparatus as claimed in claim 8, a discharge conveyor communicating with the lowermost end of said hopper and extending through the lower end of said column for transferring the bulk material received from said hopper to a remote location.

11. Apparatus as claimed in claim 8, a second support jib secured to said column and spaced above said first named support jib, a bearing member mounted on said second named jib, the vertical axis of said second bearing member being offset relative to the longitudinal axis of said column.

12. Apparatus as claimed in claim 7, a first bearing member on which said stacking means is mounted, said mounting means for said stacking means being located in substantially coaxial relation with respect to the axis about which said reclaimer device is rotated and being vertically spaced thereabove.

13. Apparatus as claimed in claim 12, said reclaimer device including an elongated boom having a conveyor operating therein, winch means located on the means for mounting said reclaimer device for rotation therewith, means for controlling pivotal movement of said elongated boom including a cable that is interconnected to said winch means and to said elongated boom, wherein operation of said winch means produces a controlled pivotal movement of said elongated boom about the horizontal pivotal axis thereof.

14. Apparatus as claimed in claim 13, a second bearing member for rotatably mounting said elongated boom, said second bearing member being located on said mounting means such that the vertical axis thereof is not coincident with the longitudinal axis of said support column.

15. Apparatus as claimed in claim 14, said reclaimer device including an extension that is interconnected to said second bearing member for movement therewith, said elongated boom being connected to said extension for pivotal movement relative thereto upon operation of said winch means.

16. Apparatus as claimed in claim 15, said support column being defined by a pair of angularly and upwardly extending support members that are spaced at the lowermost ends thereof and that are interconnected at their uppermost ends to define an A-frame, the lowermost ends of said support members being located in supporting relation with respect to said extension of said reclaimer device to aid in carrying the loads imposed thereon.

17. Apparatus as claimed in claim 16, the uppermost ends of said support members being connected to a tie bar at one end thereof, the other end of said tie bar being interconnected to said second bearing member for rotation therewith, a sheave mounted on the uppermost end of said A-frame and receiving said cable thereon, wherein said cable extends from said sheave to a connection thereof with the pivotal elongated boom of said reclaimer device for effecting the pivotal movement thereof.

18. Apparatus as claimed in claim 17, a bottom connector secured to the lowermost ends of the support members and to said extension, a roller mounted on said bottom connector, and a fixed bottom ground support receiving said roller thereon for rolling movement to provide for the rotary movement of said reclaimer device with said second bearing member.

19. Apparatus as claimed in claim 1, a support jib secured to said support column intermediate the ends thereof, a first bearing member mounted on said support jib in offset relation to said support column and supporting said member utilized for reclaiming for rotating movement relative to said support column, a second support jib secured to said support column at the uppermost end thereof and being located in vertically aligned relation with respect to said first named support jib, a second bearing member mounted on said second suport jib and spaced vertically above said first bearing member in coaxial relation therewith and in offset relation to said column, said stacking means being mounted on said second bearing member for rotating movement relative to said column and said member utilized for reclaiming, and means for operating said stacking means for depositing said bulk material on said pile at selected locations.

20. Apparatus as claimed in claim 19, said means utilized for reclaiming including a reclaimer device having an elongated pivotal boom member having a conveyor that is operable on said boom member for transferring said bulk material from said pile, winch means mounted on said first bearing member and being rotatable with said reclaimer device, a cable interconnecting said winch means with said pivotal boom member, wherein said winch means is operable to pivotally move said boom member of said reclaimer device about a horizontal axis, said reclaimer device including a fixed extension member that is supported by said first named jib and that is rotatable relative thereto and, said conveyor extending into said extension member for transferring said bulk material therethrough, a chute mounted under said second jib and being rotatable with said reclaimer device, said fixed extension member communicating with said chute for transferring said bulk material thereto for deposit on a discharge conveyor located below said chute.

21. Apparatus as claimed in claim 20, means cooperating with said first jib for supporting said reclaimer device and including a wheel assembly fixed to the lower end of said reclaimer device and having wheels secured thereto, and a wheel support for receiving said wheels in rolling movement thereon, wherein said supporting means cooperates with said first jib and the bearing member mounted thereon for supporting said reclaimer device for rotary movement relative to said column.

22. Apparatus as claimed in claim 1, said stacking means being mounted for rotation about a vertical axis that is not coincident with respect to the longitudinal axis of said column.

23. Apparatus as claimed in claim 22, a foundation mounted in fixed position, a support frame mounted on said foundation for rotation relative thereto and relative to said stacking means and said column, the vertical axis of said support frame being offset with respect to the longitudinal axis of said column.

24. Apparatus as claimed in claim 23, said member being utilized for reclaiming including a reclaimer device that is interconnected to said support frame for rotation therewith, and being pivotal about a horizontal axis, means mounted on said support frame for controlling the pivotal movement of said reclaimer device, wherein said reclaimer device is controlled to follow the surface of said pile, means for rotating said support frame and reclaimer device mounted thereon relative to said column, a reclaimer conveyor carried by said reclaimer device, and means for operating said reclaimer device conveyor for transferring bulk material from said pile to a discharge area in said foundation.

25. Apparatus as claimed in claim 24, said reclaimer device including an elongated boom and an extension to which the boom is pivotally connected, said extension being interconnected to said support frame for mounting said reclaimer device thereon for rotating movement therewith, said conveyor extending into said fixed extension for carrying the bulk material therethrough, and means located at said foundation for receiving said bulk material for directing it to said discharge area.

26. Apparatus as claimed in claim 25, a hopper located at said foundation for receiving bulk material from said reclaimer device, said hopper being fixed in position and having an unobstructed open receiving end, and a discharge conveyor extending inwardly of said foundation and communicating with the discharge end of said hopper for receiving bulk material therefrom for transfer to a remote location.

27. Apparatus as claimed in claim 1, said stacking means and said member utilized for reclaiming defining a single combination stacker-reclaimer unit that is mounted for pivotal movement and that is rotatably mounted relative to said column, means for feeding said bulk material to said combination unit including a feed conveyor, a feed hopper communicating with said feed conveyor and a feed spout communicating with said feed hopper, said feed spout being mounted for rotating movement with said combination unit relative to said column and directing said bulk material as received from said feed hopper to a trough conveyor that is operatively mounted in said combination unit, said combination unit selectively distributing said bulk material on said pile and reclaiming said bulk material from said pile for transfer to a discharge area.

28. Apparatus as claimed in claim 27, the longitudinal axis of said column extending substantially in a vertical direction.

29. Apparatus as claimed in claim 27, the longitudinal axis of said column extending substantially in a direction that is inclined to the vertical.

30. Apparatus as claimed in claim 27, said feed spout being pivotally and telescopically mounted to follow the pivotal movement of said combination unit, a frame member being mounted on said column but rotatable relative thereto and being offset therefrom, said combination unit being pivotally mounted on said frame member for rotation therewith, and a separate reclaimer device rotatable substantially independently relative to said frame member for directing bulk material to said discharge area.

31. Apparatus as claimed in claim 27, said member that is utilized for reclaiming said bulk material including a rotatable reclaimer device having an elongated boom formed as a part thereof, said boom being pivotal about an horizontal axis and being supported by said support column for rotation relative thereto, said boom being operable to direct the material at said pile inwardly toward the pivot axis thereof, means for rotating said reclaimer device independently of said stacking means, and a separate reclaimer element located adjacent to the base of said support column for receiving material as reclaimed from said pile by said boom for directing said material to a discharge area.

32. Apparatus as claimed in claim 31, said separate reclaimer device comprising a screw conveyor, the axis of which is substantially horizontal, said screw conveyor projecting beneath said pile and being independently rotatable on its own axis relative to said stacker reclaimer unit and being movable in a circular path relative to said pile to direct said bulk material to said discharge area.

33. Apparatus as claimed in claim 27, a motor winch unit mounted on said combination unit and movable therewith, a hoisting cable being connected at its outer end to said combination unit and to a fixed member interconnected to said column, said motor winch unit being operable to selectively move said hoisting cable to effect a pivotal movement of said combination unit.

34. Apparatus as claimed in claim 1, said member utilized for reclaiming being mounted for pivotal and rotational movement relative to said column, a conveyor movingly carried by said member for transferring said bulk material from said pile to a discharge area, said stacking means including a material distributing device mounted on said column for rotating movement relative thereto, said material distributing device receiving said bulk material from said feeding means and including a distributing mechanism that slings the material onto the pile.

35. Apparatus as claimed in claim 34, the longitudinal axis of said column extending substantially in a vertical direction.

36. Apparatus as claimed in claim 34, the longitudinal axis of said column extending substantially in a direction that is inclined to the vertical.

37. Apparatus as claimed in claim 1, said support column including an inclined beam to the lowermost end of which are joined spaced apart base members that define an entryway therebetween, a base extending below said base members for anchoring said base members in firm position, said base members terminating at the outermost ends thereof in foundations, and a pair of stabilizers that are connected at one end thereof to the uppermost end of said column and to the other ends thereof to said foundations for stabilizing and supporting said column when said column is exposed to substantial loads thereon.

38. Apparatus as claimed in claim 1, said member that is utilized for reclaiming said bulk material including a screw conveyor that is independently mounted adjacent to the base of said support column, means for moving said screw conveyor in a circular path relative to said pile, and means for independently rotating said screw conveyor on its own axis for directing said bulk material to a discharge area.

39. Apparatus as claimed in claim 38, a reclaimer device supported by said support column and being rotatable with respect thereto and said stacking means, said reclaimer device being pivotal about a horizontal axis to reclaim material from said pile and for directing said material to said screw conveyor for the discharge thereof.

40. Apparatus as claimed in claim 2, the member utilized for reclaiming being defined by a reclaimer device that includes an elongated boom, said reclaimer device being supported by said vertical support column and being rotatable relative thereto, the axis of rotation of said reclaimer device being relatively vertical and being offset with respect to the axis of said support column.

41. Apparatus as claimed in claim 40, a first laterally extending jib being fixed to said column and supporting said stacking means for rotation thereon, the axis of rotation of said stacking means being coincident with the axis of rotation of said reclaimer device.

42. Apparatus as claimed in claim 41, a second laterally extending jib being fixed to said column and spaced below said first jib for supporting said reclaimer device thereon in axial relation with respect to said stacking means.

43. Apparatus as claimed in claim 40, said feeding means that is located above said stacking means for feeding said bulk material thereto being supported by said support column.

* * * * *